United States Patent
Babu et al.

(10) Patent No.: US 10,983,895 B2
(45) Date of Patent: Apr. 20, 2021

(54) SYSTEM AND METHOD FOR DATA APPLICATION PERFORMANCE MANAGEMENT

(71) Applicant: UNRAVEL DATA SYSTEMS, INC., Menlo Park, CA (US)

(72) Inventors: Shivnath Babu, Milpitas, CA (US); Adrian Daniel Popescu, Zurich (CH); Erik Lik Han Chu, Burlingame, CA (US); Alkiviadis Simitsis, Santa Clara, CA (US)

(73) Assignee: Unravel Data Systems, Inc., Menlo Park, CA (US)

( * ) Notice: Subject to any disclaimer, the term of this patent is extended or adjusted under 35 U.S.C. 154(b) by 18 days.

(21) Appl. No.: 16/152,091

(22) Filed: Oct. 4, 2018

(65) Prior Publication Data
US 2019/0370146 A1 Dec. 5, 2019

Related U.S. Application Data

(60) Provisional application No. 62/680,664, filed on Jun. 5, 2018.

(51) Int. Cl.
| | |
|---|---|
| *G06F 9/44* | (2018.01) |
| *G06F 11/36* | (2006.01) |
| *G06N 5/02* | (2006.01) |
| *G06N 20/00* | (2019.01) |
| *G06F 16/2453* | (2019.01) |

(52) U.S. Cl.
CPC .... *G06F 11/3612* (2013.01); *G06F 16/24545* (2019.01); *G06N 5/025* (2013.01); *G06N 20/00* (2019.01)

(58) Field of Classification Search
CPC ........................................................ G06F 9/44
See application file for complete search history.

(56) References Cited

U.S. PATENT DOCUMENTS

| | | | |
|---|---|---|---|
| 7,028,174 B1 * | 4/2006 | Atai-Azimi | G06F 21/14 713/1 |
| 7,356,452 B1 * | 4/2008 | Naamad | G06F 11/3457 703/22 |
| 9,524,077 B1 * | 12/2016 | Pattan | H04N 21/4312 |
| 2007/0067113 A1 * | 3/2007 | Engel | G01R 31/2886 702/33 |
| 2008/0222642 A1 * | 9/2008 | Kakarla | G06F 9/5077 718/104 |
| 2012/0239739 A1 * | 9/2012 | Manglik | G06F 9/5077 709/203 |
| 2014/0344926 A1 * | 11/2014 | Cunningham | H04L 63/1441 726/22 |

(Continued)

*Primary Examiner* — Jae U Jeon
(74) *Attorney, Agent, or Firm* — Steptoe & Johnson LLP; Robert Greenfield

(57) ABSTRACT

A system and method for data application performance management is disclosed. According to one embodiment, a computer-implemented method, comprises receiving a selection of a goal for an application on a cluster of compute nodes. The goal includes one or more of a speedup goal, an efficiency goal, a reliability goal, and a service level agreement goal. The application on the cluster is executed. Data associated with the goal is collected. A recommendation to adjust one or more parameters that would allow the goal to be achieved.

21 Claims, 20 Drawing Sheets

(56) References Cited

U.S. PATENT DOCUMENTS

| | | | |
|---|---|---|---|
| 2015/0333994 A1* | 11/2015 | Gell | G06F 3/067 |
| | | | 709/224 |
| 2016/0028608 A1* | 1/2016 | Dasgupta | H04L 43/16 |
| | | | 370/252 |
| 2016/0188534 A1* | 6/2016 | Suri | G06F 9/4403 |
| | | | 712/42 |
| 2016/0239544 A1* | 8/2016 | Kondo | G06F 16/2291 |
| 2016/0300144 A1* | 10/2016 | Santhanam | G06Q 30/0631 |
| 2016/0301768 A1* | 10/2016 | Garces-Erice | G06F 9/5077 |
| 2016/0344762 A1* | 11/2016 | Jou | G06N 7/005 |
| 2017/0192875 A1* | 7/2017 | Shani | G06F 11/3608 |
| 2018/0368010 A1* | 12/2018 | Mitchell | H04W 24/06 |
| 2019/0163560 A1* | 5/2019 | Purushothaman | G06F 11/0709 |
| 2019/0303118 A1* | 10/2019 | Avinash Dorle | G06F 8/77 |

* cited by examiner

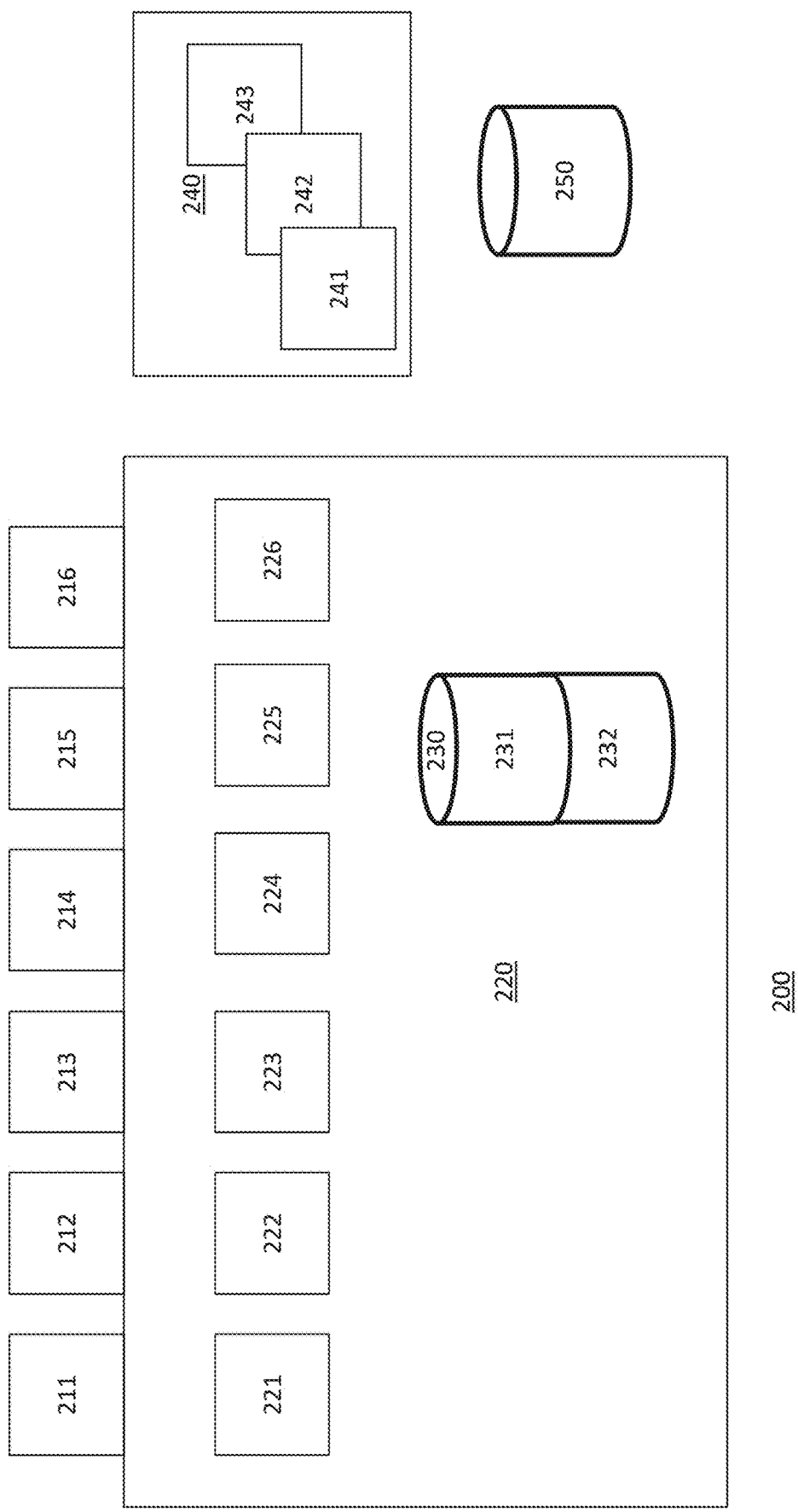

| Selector | AppID | User | Queue | Cluster | KPI1 | KPI2 | KPI3 | KPI4 | KPI5 |
|---|---|---|---|---|---|---|---|---|---|
| y | | | | | | | | | |
| n | | | | | | | | | |

SYSTEM AND METHOD FOR DATA APPLICATION PERFORMANCE MANAGEMENT

The present application claims the benefit of and priority to U.S. Provisional Patent Application Ser. No. 62/680,664 filed on Jun. 5, 2018 and entitled "System and Method for Data Application Performance Management," which is hereby incorporated by reference.

TECHNICAL FIELD

The present application relates generally to the field of computers and in particular, a system and method for data application performance management.

BACKGROUND

Data systems are very complex. Big data systems are even more complex. The productivity of application developers and operations staff plummets when they have to constantly track many interdependent factors such as application behavior, resource allocation, data layout, and job scheduling to keep big data applications running. In addition, application developers often have to deal with problem applications, which may run slow or slower than in the past, or even fail.

Enterprises are running more and more big data applications in production (like ETL, business intelligence applications, online dashboards, analytics, machine learning, etc.). These applications have to satisfy service level agreements (SLAs) related to a multiplicity of objectives such as performance, cost, reliability, maintainability, scalability, and so on. For example to satisfy performance SLAs, applications have to meet performance-related business needs such as deadlines (e.g., ETL job to finish by market close), fast response time (e.g., Hive queries), and reliability (e.g., fraud application). The data platform team (architect, operations, and developers) needs to ensure application reliability, optimize storage and compute while minimizing infrastructure costs, and optimize DevOps productivity. Problems associated with the operation of big data systems becomes hard to identify, diagnose, and fix. Existing systems do not address or adequately solve these problems. The present system provides solutions to these problems that prior data and application management systems have as described below.

SUMMARY

A system and method for data application performance management is disclosed. According to one embodiment, a computer-implemented method comprises receiving a selection of a goal for an application on a cluster of compute nodes. The goal includes one or more of a speedup goal, an efficiency goal, a reliability goal, and a service level agreement goal. The application on the cluster is executed. Data associated with the goal is collected. A recommendation to adjust one or more parameters that would allow the goal to be achieved.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

FIG. 2A illustrates a data intelligence platform, according to one embodiment.

FIG. 10 an exemplary applications panel, according to one embodiment.

Figure 1:
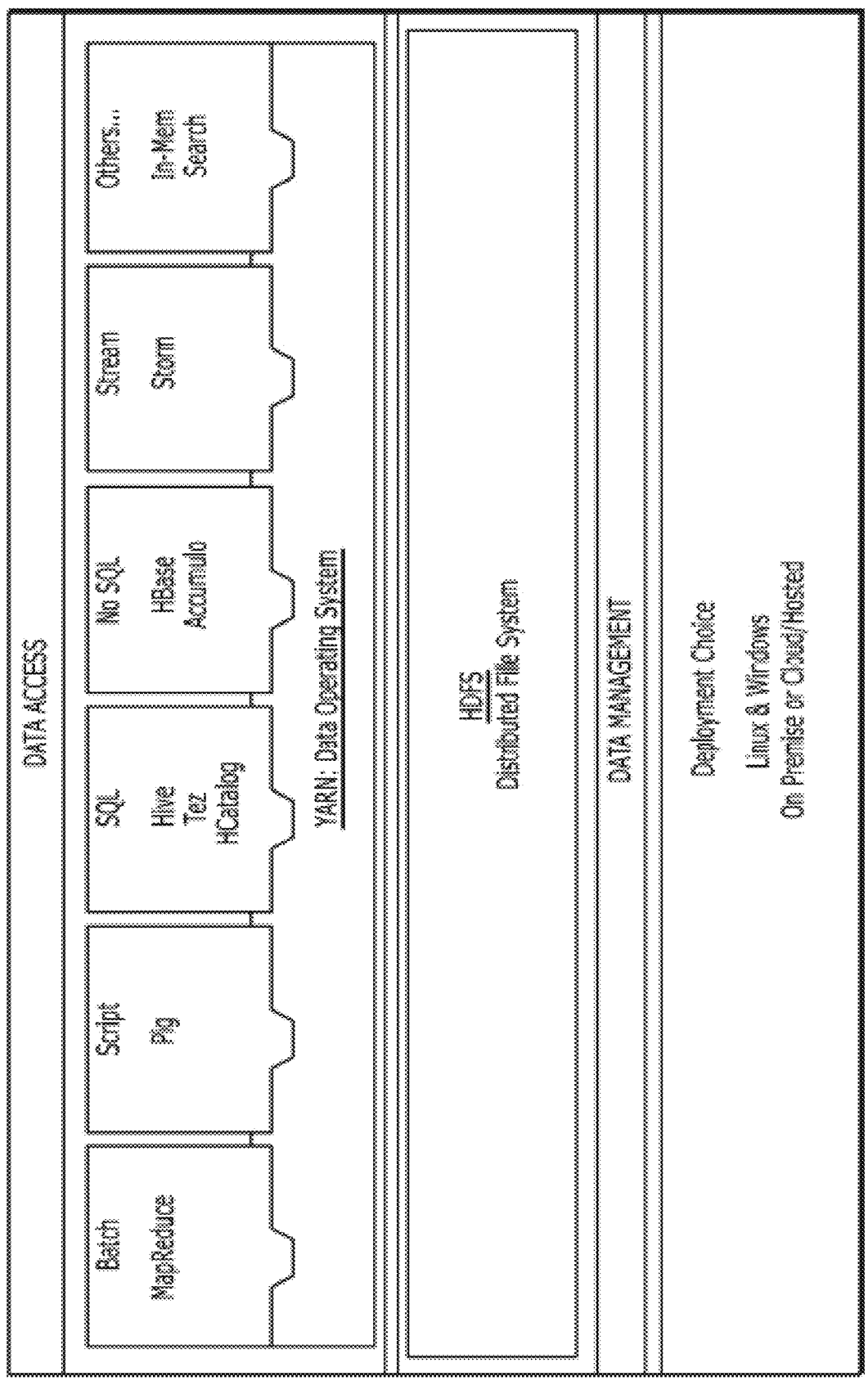
FIG. 1 illustrates an exemplary big data system, according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A system and method for data application performance management is disclosed. According to one embodiment, a computer-implemented method comprises receiving a selection of a goal for an application on a cluster of compute nodes. The goal includes one or more of a speedup goal, an efficiency goal, a reliability goal, and a service level agreement goal. The application on the cluster is executed. Data associated with the goal is collected. A recommendation to adjust one or more parameters that would allow the goal to be achieved.

The following disclosure provides different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present system provides a process for correlating metrics across every layer of a big data stack, from the infrastructure to the services and applications, as well as within each layer to give a true full-stack view of application performance across one or more multi-tenant clusters.

The present system then provides a process that applies advance analysis including artificial intelligence, machine learning, and predictive analytics, to empower DevOps to optimize, troubleshoot, and analyze applications with a single tool. The present system also provides a process for enabling accelerated application performance testing and debugging.

FIG. 1 shows an exemplary big data system, according to one embodiment. The top part of FIG. 1 shows the breadth of applications that the present system and method can support. A program is submitted on a big data system to produce desired results. These applications come in a wide variety of programs and implementations including SQL, Java, Python, C/C++, Scala, R, Matlab, MapReduce, Pig, Hive, Tez, HCatalog, HBase, Accumulo, Storm, In-Mem Search, etc. Applications may be a plurality of applications (e.g., queries). Applications can be submitted directly or be submitted through business intelligence or report generation software such as Tableau or Grafana. It is apparent that the present system and method can cover other application types submitted both directly and indirectly.

Figure 2:
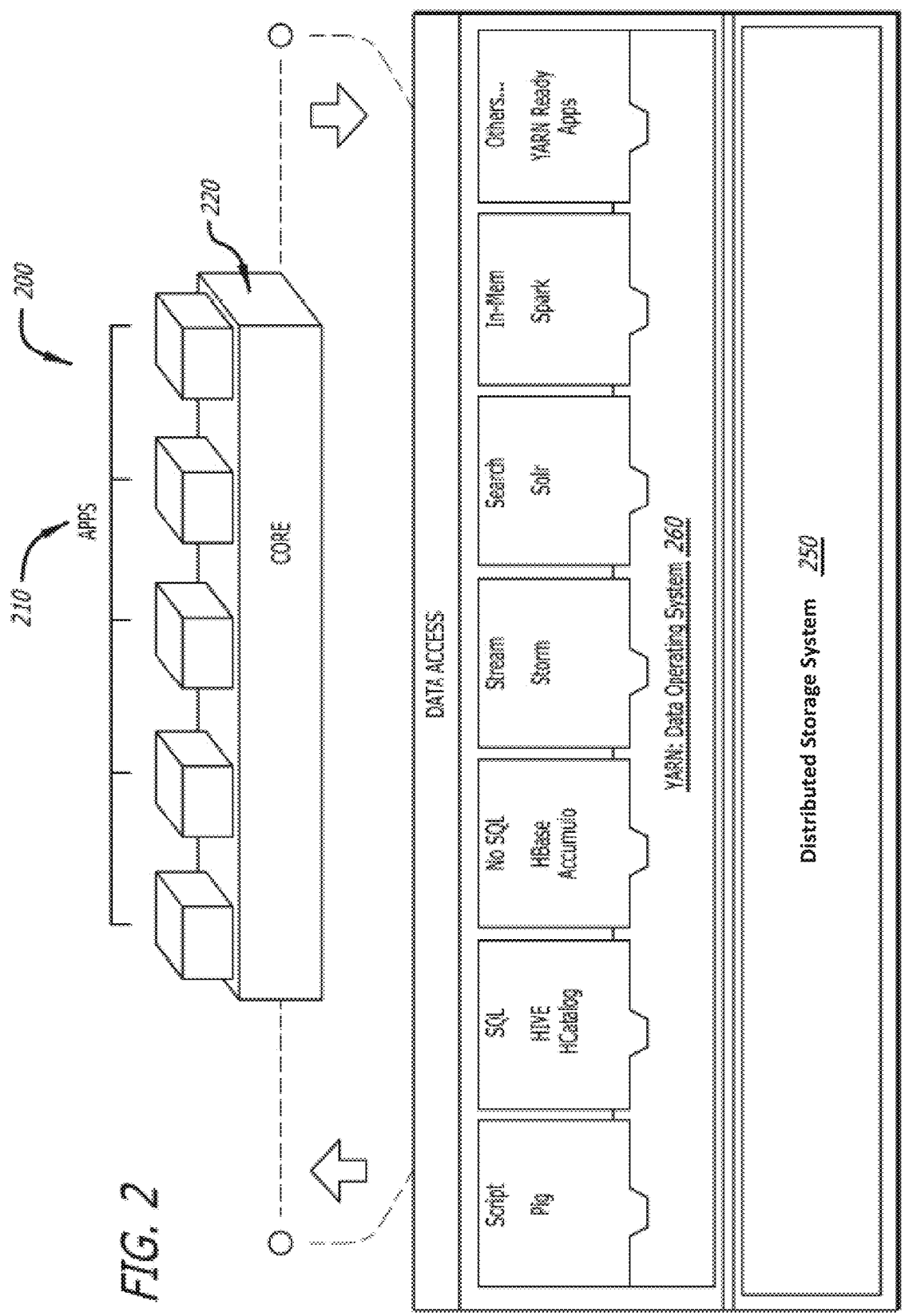
FIG. 2 shows the system architecture of the present system, according to one embodiment.

FIG. 2 shows the system architecture of the present system, according to one embodiment. The present intelligence platform (e.g., system) 200 has a core 220 and a suite of applications 210. Examples of core applications include, but are not limited to, Deep Events 211, Live Alerts 212, Info Tags 213, and Entity Search 214 (as shown in FIG. 2A). The core 220 is a data processing platform that continuously collects, analyzes, and stores data about entities and applications of a distributed storage system 250 (e.g., Hadoop Distributed File System, Amazon S3, Azure Blob Store). Data flows to and from the intelligence platform 200 and distributed storage system 250. The distributed storage system 250 runs a data operating system 260 (e.g., YARN) and various applications on clusters of compute nodes therefrom such as Script applications (e.g., Pig, Cascading, Python), structured query language (SQL) applications (e.g., SQL, SparkSQL, Hive, HCatalog), Not Only (NO) SQL applications (e.g., HBase, Accumulo), stream applications (e.g., Storm), search applications (e.g., Solr), In-memory applications (e.g., Spark), analytics, machine learning, Extraction, Transformation and Loading (ETL), Massive Parallel Processing (MPP) applications, Apache™ KAFKA applications, and other applications (e.g., YARN-ready applications). The application may be encoded and run in one or more of these big data and massively parallel processing languages and systems. The results of the analysis may be fed back to the distributed storage system 250 to increase the performance of the distributed file system 250. The present system processes this data to power the applications running on the cluster of compute nodes. The distributed file system 250 may be on-premise, in the cloud, or a hybrid.

FIG. 2A illustrates a data intelligence platform, according to one embodiment. The present intelligence platform 200 applies several processes to the data gathered in the core to power events, alerts, root-cause analysis, recommendations, and solutions.

Table 1 shows exemplary components of the present intelligence platform 200.

TABLE 1

| Applications | Features |
| --- | --- |
| 1) Application Manager 221<br>  a) MapReduce Manager<br>  b) Pig Manager<br>  c) Hive Manager<br>  d) Spark Manager<br>  e) Impala Manager<br>  f) Presto Manager<br>  g) Custom Application Manager | Includes directed acyclic graph (DAG), Key Performance Indicators (KPIs) and app details.<br>Enables live, automatic diagnosis and resolution, for example, of:<br>  Slow-running applications<br>  Failed or killed applications<br>  Unpredictable application behavior<br>  Applications producing incorrect results<br>  Applications performing differently than in the past<br>  Hanging and non-responsive applications |
| 2) Workflow Manager 222<br>  a) Oozie Workflow Manager<br>  b) Custom Workflow Manager | Includes DAG, KPIs and workflow details.<br>  Correlates workflows to business processes and SLAs<br>  Enables monitoring and meeting workflow Service Level Agreements (SLAs)<br>  Performs comparison, trending, and reporting of data access, resource usage, configuration, etc., among various runs of a workflow over time |

TABLE 1-continued

| Applications | Features |
|---|---|
| | Provides a single pane of glass for applications spanning multiple execution and storage engines |
| 3) Core Apps<br>  a) Deep Events 211<br>  b) Live Alerts 212<br>  c) Info Tags 213<br>  d) Entity Search 214 | Automatically detects, diagnoses, and recommends solutions for inefficiencies and errors in applications and resources<br>Provides custom alerts to track all activities, inefficiencies, and errors in the cluster<br>Enables custom tagging of applications, resources, tables, users, etc., for reporting, discoverability, and comparison.<br>Enables powerful and easy search over applications, resources, tables, users, etc. |
| 4) Ops Central 223<br>  a) Application Central<br>  b) Resource Central<br>  c) Data Central<br>  d) User Central<br>  e) Service Central<br>  f) Inefficiencies Central<br>  g) Reporting | Enables automatic diagnosis and resolution of inefficient cluster usage<br>Proactively alerts on inefficient or inappropriate use of data and resources by applications<br>Chargeback/Showback - Splits usage and cost of the cluster and resources by user group, application type, etc.<br>Automatically creates leaderboards to identify the most resource-needing, resource-consuming, and resource-wasting applications, users, tables, and queues<br>Correlates changes in application performance with changes in data size, resource contention, and performance degradation of services (e.g., Hadoop services)<br>Correlates changes in application performance with hardware and software failures of the underlying systems<br>Provides predictions of compute and resource capacity needs based on past and current usage<br>Provides views and analysis of operational data, such as resource budget (e.g., pool or queue) utilization at a cluster level and provides recommendations to help with multi-tenant resource allocation |
| 5) Data Manager 224<br>  a) Top-N lists<br>  b) Pattern Analyzer<br>  c) Auditor | Identifies hot (i.e., frequently used) and cold (i.e., less frequently used) tables and files<br>Summarizes data usage and access patterns across files, tables, columns, queries, and compute operations like joins<br>Recommends the best data partitioning and storage layout based on usage<br>Audits data access by applications and users<br>Identifies potentially harmful and performance degrading factors like an increasing number of small files or file containers<br>Predicts trends of usage in the future based on usage in the past |
| 6) Planner 225 | Identify cheapest or fastest infrastructure for workload<br>Identify an infrastructure for workload that satisfies SLAs<br>Which datasets to move<br>Which application engine to choose for both compute and storage<br>How to allocate resources<br>When and how to scale-up and scale-down<br>How to allocate and share resources<br>How to prioritize applications |
| 7) Sessions Manager 226 | optimize an application running on a cluster of compute nodes to meet a particular goal |

The present intelligence platform 200 comes with built-in core applications 211-216 that power smart features and allow for the productive and efficient management of big data systems.

Deep Events 211 are powered by machine-learning algorithms. The deep events application 211 takes a role of a system expert to identify errors and inefficiencies in the system automatically. The deep events application 211 also provides automatic root-cause analysis and solutions for application and system-level problems. The deep events application 211 is tightly integrated with other components such as the application manager 221, workflow manager 222, ops central 223, data manager 224 and sessions manager 226.

The application manager 221 provides a comprehensive view into the behavior of applications such as MapReduce, Pig, Hive, Spark, and custom applications. The application manager 221 is used by system application owners (e.g., developers, business analysts, data scientists) to quickly understand and resolve inefficiencies, bottlenecks, and reasons for application failure, and also understand application behavior and execution.

In addition to applications being submitted directly through a program built in a programming language like SQL, Hive, Pig, Spark, etc. the application manager 221 also captures applications that are submitted indirectly through a third party program. For example, a user who wants to check out graphs using Tableau™ or Grafana™ software may submit SQL or Hive applications under the cover. The application manager 221 tells the user when his/her graph does not show up or takes a long time to load and why this happens. The application manager 221 shows the events and the status (e.g., success, killed), a duration, data I/O, and the number of resources, the execution view.

The present intelligence platform 200 has a sessions manager 226 through which a user interacts with the application manager 221 to optimize an application running on the cluster to meet a particular goal. One session scenario includes the user specifying an application and a goal, the identification of a first list of recommendations that may improve the application toward meeting the goal, an execution of the application with the enforcement of one or more of the recommendations to the application and the compute system that executes the application, and the process goes on with the identification of recommendations and their application until a termination criterion is met. Example termination criteria include the satisfaction of a goal (e.g., expressed as an objective function) or a termination threshold (e.g., a number of session iterations).

The present intelligence platform 200 includes monitoring data 230 that includes historical data 231 and probe data 232. The sessions manager 226 uses the monitoring data 230 to provide recommendations to optimize applications running on a cluster of compute nodes 240. Monitoring data 450 is represented as <X,Y>.

X is a setting that is a nested vector representing applications, data, resources, and/or a configuration Y is a vector of metrics A metric is a property that can be measured to quantify the state of an entity or activity. They include properties such as the number of open file descriptors or CPU utilization percentage across your cluster. Managers may monitor a number of performance metrics for services and role instances running on clusters. These metrics are monitored against configurable thresholds and can be used to indicate whether a host is functioning as expected or not. Metrics may include metrics about jobs (such as the number of currently running jobs and their CPU/memory usage), Hadoop services (such as the average HDFS I/O latency and number of concurrent jobs), clusters (such as average CPU load across all hosts) and so on.

Metrics may include one or more of: Accumulo Metrics, Active Database Metrics, Active Key, Trustee Server Metrics, Activity Metrics, Activity Monitor Metrics, Agent Metrics, Alert Publisher Metrics, Attempt Metrics, Management Service Metrics, Manager Server Metrics, Cluster Metrics, Datallode Metrics, Directory Metrics, Disk Metrics, Event Server Metrics, Failover Controller Metrics, Filesystem Metrics, Flume Metrics, Flume Channel Metrics, Flume Sink Metrics, Flume Source Metrics, Garbage Collector Metrics, HBase Metrics, HBase REST Server Metrics, HBase RegionServer Replication Peer Metrics, HBase Thrift Server Metrics, HDFS Metrics, HDFS Cache Directive Metrics, HDFS Cache Pool Metrics, HRegion Metrics, HTable Metrics, History Server Metrics, Hive Metrics, Hive Metastore Server Metrics, HiveServer2 Metrics, Host Metrics, Host Monitor Metrics, HttpFS Metrics, Hue Metrics, Hue Server Metrics, Impala Metrics, Impala Catalog Server Metrics, Impala Daemon Metrics, Impala Daemon Resource Pool Metrics, Impala Llama ApplicationMaster Metrics, Impala Pool Metrics, Impala Pool User Metrics, Impala Query Metrics, Impala StateStore Metrics, Isilon Metrics, Java KeyStore KMS Metrics, JobHistory Server Metrics, JobTracker Metrics, JournalNode Metrics, Kafka Metrics, Kafka Broker Metrics, Kafka Broker Topic Metrics, Kafka MirrorMaker Metrics, Kafka Replica Metrics, Kerberos Ticket Renewer Metrics, Key Management Server Metrics, Key Management Server Proxy Metrics, Key Trustee KMS Metrics, Key Trustee Server Metrics, Key-Value Store Indexer Metrics, Kudu Metrics, Kudu Replica Metrics, Lily HBase Indexer Metrics, Load Balancer Metrics, MapReduce Metrics, Master Metrics, Monitor Metrics, NFS Gateway Metrics, NameNode Metrics, Navigator Audit Server Metrics, Navigator HSM KMS backed by SafeNet Luna HSM Metrics, Navigator HSM KMS backed by Thales HSM Metrics, Navigator Luna KMS Metastore Metrics, Navigator Luna KMS Proxy Metrics, Navigator Metadata Server Metrics, Navigator Thales KMS Metastore Metrics, Navigator Thales KMS Proxy Metrics, Network Interface Metrics, NodeManager Metrics, Oozie Metrics, Oozie Server Metrics, Passive Database Metrics, Passive Key Trustee Server Metrics, RegionServer Metrics, Reports Manager Metrics, ResourceManager Metrics, SecondaryNameNode Metrics, Sentry Metrics, Sentry Server Metrics, Server Metrics, Service Monitor Metrics, Solr Metrics, Solr Replica Metrics, Solr Server Metrics, Solr Shard Metrics, Spark Metrics, Spark (Standalone) Metrics, Sqoop 1 Client Metrics, Sqoop 2 Metrics, Sqoop 2 Server Metrics, Tablet Server Metrics, TaskTracker Metrics, Telemetry Publisher Metrics, Time Series Table Metrics, Tracer Metrics, User Metrics, WebHCat Server Metrics, Worker Metrics, YARN (MR2 Included) Metrics, YARN Pool Metrics, YARN Pool User Metrics, ZooKeeper Metrics, etc.

Monitoring data 230 includes historical and probe data such as: (i) configuration, metrics, and alerts from applications like MapReduce™, Spark™, Impala™, Hive™, Tez™, LLAP™, Kafka™, SQL, etc. collected from APIs, logs, and sensors, (ii) configuration, metrics, and alerts from Resource Manager APIs like YARN™, Kubernetes™, Mesos™, etc., (iii) configuration, metrics, alerts, and metadata from Hive Metastore™, Data catalogs, HDFS, S3, Azure™ blob store, etc., (iv) configuration, metrics, and alerts from Application Timeline Server, Hive™ History Server, Spark™ History Server, Cloudwatch™, Azure™ HDInsight Log Analytics, etc., (v) configuration, metrics, and alerts from cluster and database managers like Ambari™, Cloudera Manager™, Amazon Redshift™, Microsoft Azure™ SQL Warehouse, etc., (vi) configuration, metrics, and alerts from workflow engines like Oozie™, Airflow™, etc., (vii) configuration, metrics, and alerts from Kafka™, HBase™, and other NoSQL systems, and others.

The present intelligence platform 200 communicates with a cluster of compute nodes 240 that include nodes 241-243. The cluster of compute nodes 240 communicate with distributed storage system 250. As mentioned above, the cluster of compute nodes 240 run or execute applications, such as Script applications (e.g., Pig, Cascading, Python), structured query language (SQL) applications (e.g., SQL, SparkSQL, Hive, HCatalog), Not Only (NO) SQL applications (e.g., HBase, Accumulo), stream applications (e.g., Storm), search applications (e.g., Solr), In-memory applications (e.g., Spark), analytics, machine learning, Extraction, Transformation and Loading (ETL), Massive Parallel Processing (MPP) applications, Apache™ KAFKA applications, and other applications (e.g., YARN-ready applications).

Figure 3:
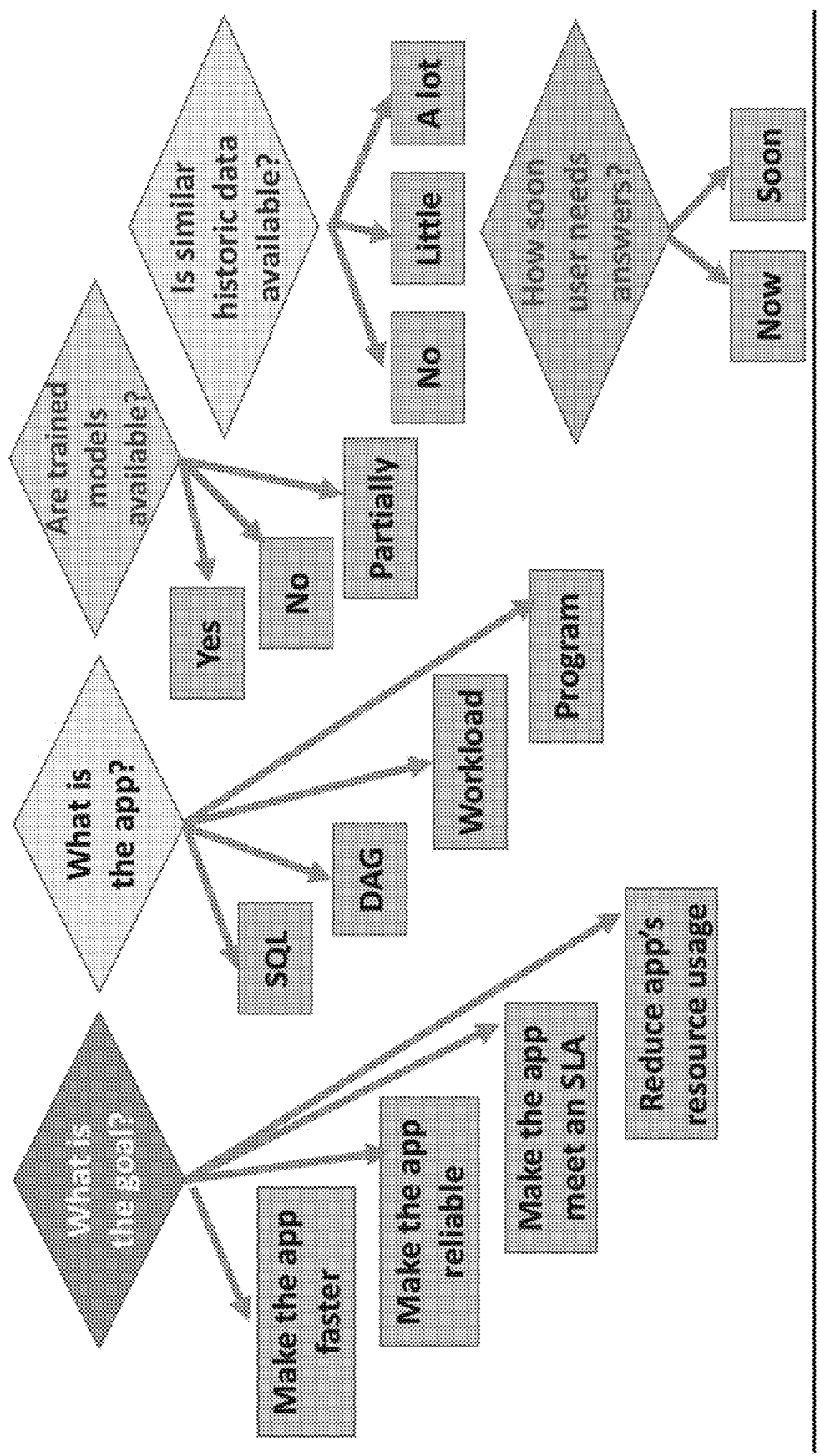
FIG. 3 illustrates an exemplary set of factors considered by the sessions manager, according to one embodiment.

The sessions manager 226 allows a user to identify a goal for a particular application running on a cluster of compute nodes 240. FIG. 3 illustrates an exemplary set of factors considered by the sessions manager 226, according to one embodiment. Sessions manager 226 handles an exemplary set of goals for applications (e.g., SQL, Program, DAG, Workload, etc.). Example goals include Speedup goal (application is slow), Efficiency goal (application is not using resources efficiently), Reliability goal (application failed), SLA goal (application is not meeting performance or other requirements), etc. The factors include:

What is the goal,
What is the app,
Are trained models available,
Is similar historical data available, and
How soon answers are needed.

The sessions manager 226 provides users with explanations of recommendation and optimization choices and correlates them with the underlying compute environment.

The sessions manager 226 leverages data from a multiplicity of sources. These sources include (a) Data collected throughout the lifespan of a single session stored in monitoring data storage 230; (b) Data collected from previous executions (i.e., outside the current session) of the same or similar applications stored in historical data storage 231; (c) Data related to past usage and effectiveness observed of the recommendations being considered in the current session stored in historical data storage 231, as these were used in the past (i.e., outside the current session).

The sessions manager 226 enables a supervised and guided optimization process, based on the actual conditions of the compute environment that executes the supervised application. In one embodiment, a user may change the course of a session by dynamically modifying the target goal or objective function parameters and thresholds. This is different than traditional optimization modules (e.g., data management systems' optimizer), which provide a monolithic optimization process typically focused on a single, invariant goal (e.g., performance). In addition, other approaches used in auto-tuned data management systems, like using deep learning to tune a workload, are also not suitable for identifying recommendations in a session as accomplished by the present intelligence platform 200. Achieving high accuracy and effectiveness in such approaches would require a significant amount of training data, which is not always available in a typical sessions scenario.

In one embodiment, the sessions manager 226 may have a multiplicity of applications that execute concurrently or sequentially on a cluster of compute nodes 240. As an example, a session manager 226 may analyze a workload of applications and a goal may be to improve throughput or latency of the entire workload.

The sessions manager 226 supports multiple ways to collect data during the lifespan of a session. These include: (i) collecting observed metrics by running an application with a specific set of recommendations, and (ii) collecting predicted values of the metrics without running an application and using services such as cost-based query optimizers. Cost-based optimization relies on a cost model or performance model to make decisions about the optimal execution of an application. For example, if an application has 3 components a1, a2, and a3, sessions manager 226 uses a cost model for each of these components, then computes the execution cost of the application if run as a1→a2→a3. Sessions manager 226 computes a different execution plan (e.g., a1→a3→a2) that may have a smaller cost. Sessions manager 226 implementing a cost-based optimizer would choose the latter plan for executing this application. Rule-based optimization relies on rules and heuristics (e.g., "when you have a2 and a3, run a3 first and a2 second".) Machine learning may be used for example to analyze all previous applications that had the three components a1,a2,a3 and based on past executions recommend a plan such as a1→a3→a2. Sessions manager 226 may use any one of the aforementioned processes or any combination of the three processes.

In one embodiment, the sessions manager 226 may impersonate a user in order to run an application on datasets that only the user has access to. In another embodiment, the sessions manager 226 may run an application in a specific resource pool or queue in order to limit the impact of running the application on a multi-tenant on-premises cluster or to lower the costs of running the application in the cloud.

Figure 3A:
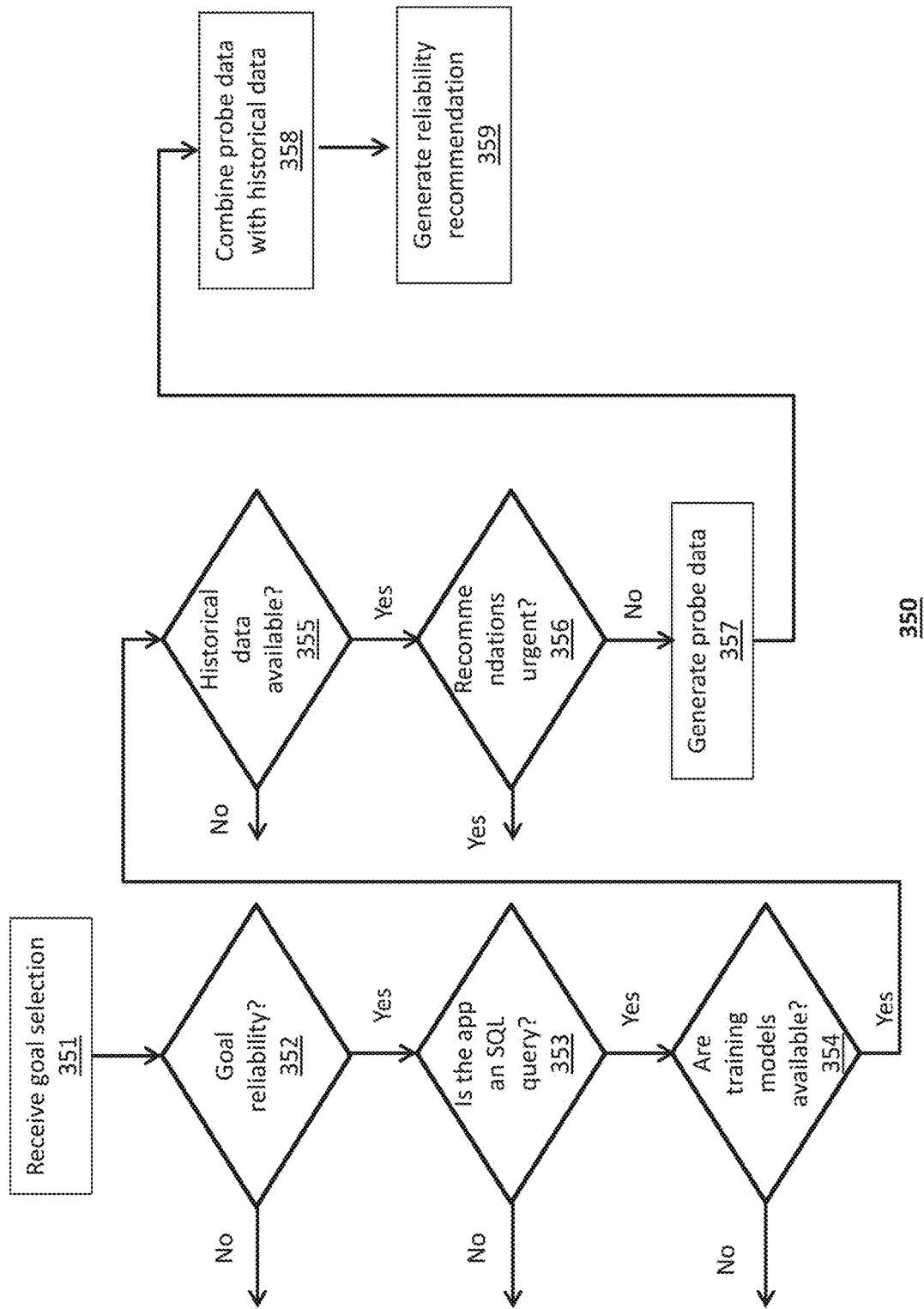
FIG. 3A illustrates an exemplary reliability recommendation process executed by the sessions manager, according to one embodiment.

FIG. 3A illustrates an exemplary reliability recommendation process 350 executed by the sessions manager 226, according to one embodiment. Sessions manager 226 receives a goal from a user through a user interface (351), as described in greater detail below. According to this embodiment, the sessions manager 226 checks if the goal is reliability (352). In alternate embodiments, the sessions manager 226 checks to see if the goal is to increase speed, meet an SLA, or reduce an application's use of resources. According to this embodiment, if the goal is reliability then the sessions manager 226 determines if the application running on the cluster of compute nodes, an SQL query (353). According to this embodiment, if the application is an SQL query then the sessions manager 226 determines if training models are available (354). According to this embodiment, if the training models are available then the sessions manager 226 determines if historical data for the SQL query is available (355). According to this embodiment, if the historical data is available then the sessions manager 226 determines if the optimization recommendations are urgent (356). If the optimization recommendations are not urgent, then sessions manager 226 generates probe data (357). Sessions manager 226 processes the probe data and the historical data (358) to generate monitoring data 230 and generates a reliability recommendation (359), according to this embodiment.

Although a specific embodiment for an exemplary reliability recommendation process has been described above, a person of skill in the art would understand that any combination of goals and applications could be used to generate an optimization recommendation with sessions manager 226.

Figure 4:
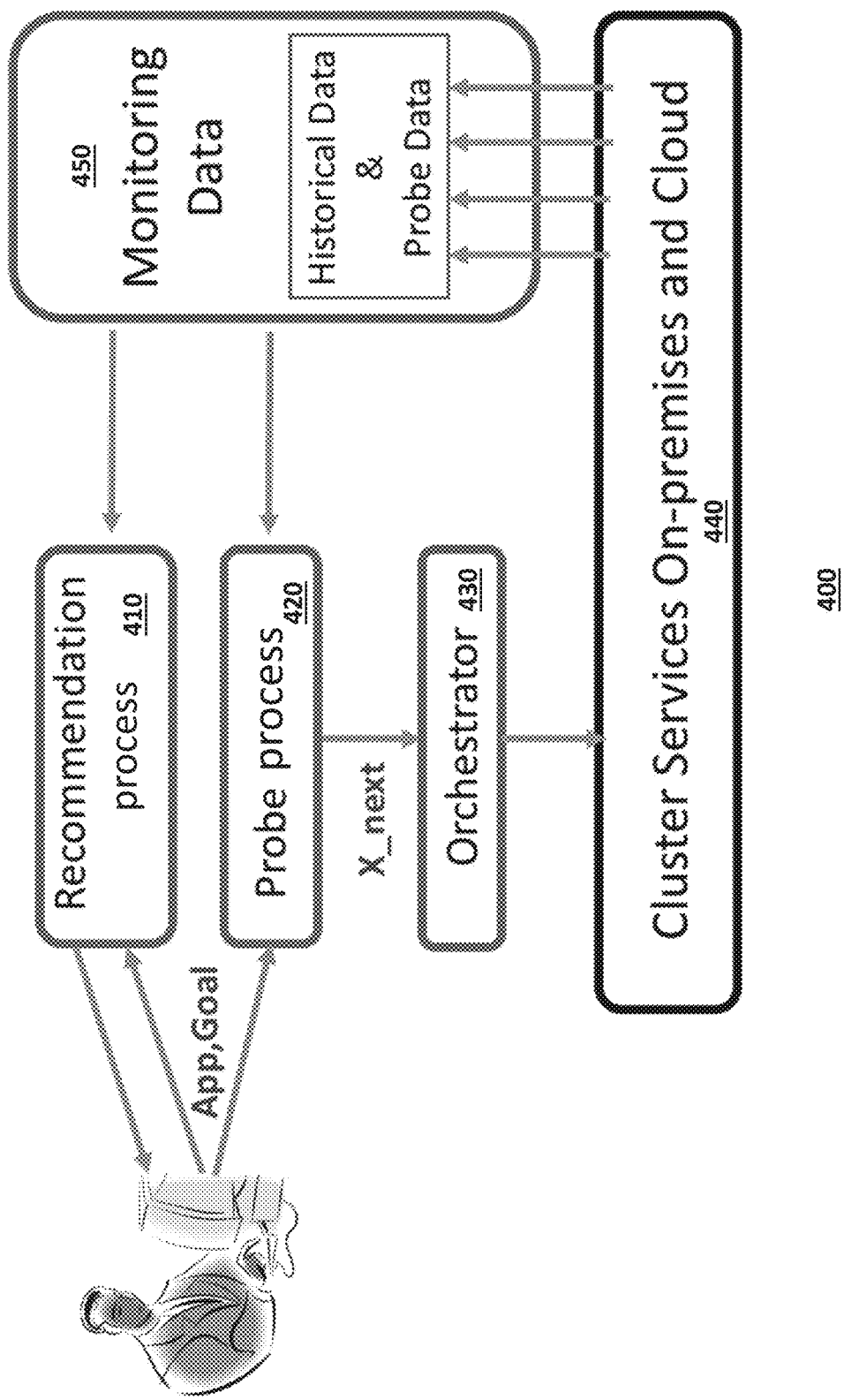
FIG. 4 illustrates an exemplary sessions manager that includes a monitoring data service, a probe process, and cluster services, according to one embodiment.

FIG. 4 illustrates an exemplary sessions manager 226 that includes a monitoring data service 450, a probe process 420, and cluster services 440. The goal of the probe process 420 is to find X_next, which is one or more of a setting, parameter, cluster configuration, or application configuration that is most promising toward meeting the goal identified by the user. Given a session having a particular application and goal (<App, Goal>), the sessions manager 226 executes the application iteratively to consider historical data and probe data to generate a recommendation. The following probe process may be used to generate probe data (357):

1. Identify all historical and probe data relevant to this session
2. Use the probe process to find X_next
3. Run (and re-run) the application using X_next to collect more probe data When a user wants a recommendation, the recommendation process 410 provides a recommendation (357) based on the user's risk tolerance and preferences:

The recommendation process 410 recommends settings for the user to use based on all the monitoring data 450 available so far.
Offers the user the choice to:
Minimize risk
Specify preferences on one or more settings or metrics (e.g., identify which setting has maximum resource efficiency subject to running time in less than 5 minutes)
Monitoring data 450 is represented as <X,Y>.
X is a setting that is a nested vector representing applications, data, resources, and/or a configuration
Y is a vector of metrics
The probe process 420:
Outputs the next setting to try
Based on estimating a Promise(X) which measures how much closer the setting X will get to the goal
Since Promise(X) is an unknown distribution, estimated as ExpectedPromise(X)
The probe process 420 outputs X_next as the value of X that maximizes ExpectedPromise(X)

Figure 5:
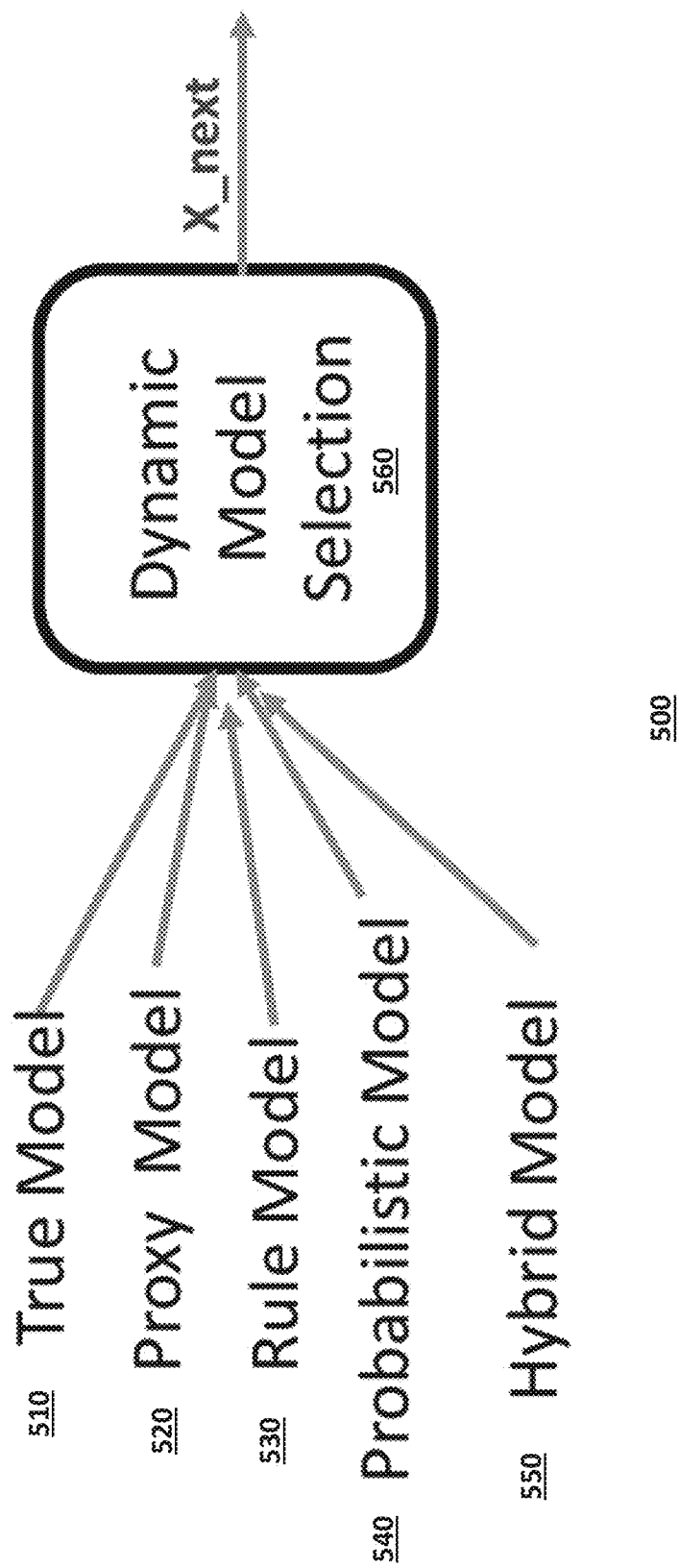
FIG. 5 illustrates an exemplary model selection process, according to one embodiment.

FIG. 5 illustrates an exemplary model selection process 500, according to one embodiment. The probe process 420 includes model selection process 500 to implement a number of models (e.g., true 510, proxy 520, rule 530, probabilistic 540, hybrid 550, etc.) to estimate Promise(X) as shown in FIG. 5. Each model outputs a candidate setting for X_next. A dynamic model selection process 560 determines which candidate setting should be used as X_next. The different models and the dynamic model selection process 560 of the probe process 420 are described below.

True Model 510: This model uses machine learning to estimate the actual performance metric that defines the goal of the session. (Note: Session=<App,Goal>) For example, when the goal is speedup:
The metric of interest is the duration taken to complete the App (other metrics could be throughput, latency, etc.)
Promise(X) can be computed based on the difference between the estimated duration when setting X is used and the current best duration presently known for the app.

Proxy Model 520: This model is similar to the True Model except that instead of the actual metric that defines the goal, the Proxy Model uses machine learning to estimate a Proxy Metric. The Proxy Metric is proportional to the actual metric, but is not guaranteed to be exactly the same as the actual value of the metric. The reason for using a Proxy Metric is that the Proxy Metric is easier to compute accurately compared to the actual metric.

An example of a Proxy Metric for <App,Speedup> sessions is computing the number of tasks of the application that can run in parallel. The more tasks that can run in parallel subject to the availability of resources, the quicker the application will finish, and the higher will be the speedup of the application. In one embodiment, a Proxy Metric can be computed by a Degree of Parallelism for Execution and Resources (DOPER) process.

Rule Model 530: This model uses a rule-based approach to find X_next. Rules encode expert knowledge about the domain. For example, a rule based optimizer is based on tuning heuristics developed by expert system (e.g., Hadoop) administrators to recommend X_next based on the monitoring data available about the application. Rule models have the advantage of being predictable in what they suggest. However, unlike the true and proxy models, they may lack the ability to learn and adapt based on the patterns seen in data.

Probabilistic Model 540: This model uses a probabilistic process to identify X_next. This model combines data from a multiplicity of sources, e.g., data collected during the session lifespan, historical data for same or similar applications, and historical data of previous usage of the recommendations considered in this session. In one embodiment, a probabilistic process may be a Markov decision process, which is a 5-tuple (E, R, P_r, R_r, d), where:
E is a finite set of session tasks
R is a finite set of recommendations
P_r (t, t') is the probability that a recommendation r applied to a task t will lead to a task t'
R_r is the reward obtained after producing task t' from task t' due to applying the recommendation r
d is a discount factor that models the value variance between present and future rewards.

For a session, the probability P_r may be computed based on the effect that the same recommendations had in past executions of tasks (outside the running session) that are of the same or similar type as t. For example, in a Tez system the sessions manager 226 may detect that enabling Tez's auto reducer parallelism feature (like "set hive.tez.auto.reducer.parallelism=true;") may improve application performance. Thus, if in the session at hand, for a specific task t a possible recommendation r is to enable reducer parallelism, this recommendation will be weighted according to a probability P_r(t,t'), which is computed based on the effect that r had on past task executions.

For the same session, a reward R_r may represent the objective improvement that r leads to. The discount factor accounts for the effect that the underlying compute and storage infrastructure has on the task execution in the running session. For example, when the same recommendation r (e.g., reducer parallelism) is applied to the same task t (e.g., a Hive query) on two different compute and storage environments (e.g., a 10-node cluster and a 100-node cluster), the effect may be different (e.g., smaller performance improvement) due to the difference in the underlying compute environment.

In this setting, the sessions manager 226 employs the probabilistic model to find a strategy for the decision maker, which describes the recommendation that the module will choose in a given task, such that the accumulated rewards, possibly discounted as indicated by the discount factor, will be maximized.

Hybrid Model 550: These models combine the techniques used by other models. For example, a common approach is to combine rules that encode expert knowledge with machine learning techniques to: (i) reduce the amount of training data needed to get good accuracy in a True Model, or (ii) correct for any mistakes in Rule Models in applying the expert knowledge to different environments.

Dynamic Model Selection 560: This process selects which candidate X_next setting to use from the candidate settings output by each of the models 510-550. In a session, there may be zero or more of true models 510, proxy models 520, rule models 530, probabilistic models 540, and hybrid models 550. The process 560 is based on dynamic ranking of the models 510-550. A rank is computed for each model 510-550 whenever a decision needs to be made to select X_next. Different techniques are used to determining the rank:

1. Priority-based ranking: This algorithm associates a priority with each model. The model with higher priority is ranked higher.
2. Confidence-based ranking: This algorithm computes a confidence value for each model. The model with higher confidence is ranked higher. True Models 510 or Probabilistic Models 540 have low confidence when they don't have enough training data to learn the model. In this situation of very few training data, Proxy Models 520 and Rule Models 530 tend to have higher confidence than True Models 510 or Probabilistic Models 540. As more probe data 232 becomes available, the confidence of True Models 510 or Probabilistic Models 540 increases and exceeds the confidence of Proxy Models 520 and Rule Models 530.

One Hybrid Model 550 that combines concepts from Proxy Models 520 and Rule Models 530 is the DOPER (Degree of Parallelism for Execution and Resources). DOPER offers a high confidence solution when very few training data are available.

DOPER can handle <App,Goal> sessions for:
App=Distributed data-parallel applications, such as Hive, Hadoop, MapReduce, Spark, Tez, LLAP.
Goal=A multiplicity of goals is supported, such as Speedup, Efficiency, Reliability, SLA.

In addition to Speed up and Efficiency Goals, DOPER also supports other goals, e.g., reliability and SLA goals. If the user selects a reliability goal, the sessions manager 226 analyzes and considers:
For apps that failed
Tries to identifies the root cause
If root cause can be identified and it belongs to known finite set of root causes, then runs probe algorithm specific to this root cause
Example, failure due to Out of Memory If the user selects the SLA goal for an application, the sessions manager 226 implements an extension of DOPER where the possibility of using more resources are considered as part of the setting X.

As an example, the application configuration parameters of Table 2 form an application configuration parameter space that defines the setting X for a <App,Goal> session as discussed above. Configuration parameters may also be called application properties, and include application parameters, cluster parameters (e.g., available cores, available memory, etc.) and execution parameters (e.g., requested cores, requested memory, etc.). Application parameters include parameters for MapReduce, Hadoop, Hive, Yarn, Spark, etc.

TABLE 2 spark.default.parallelism
spark.sql.shuffle.partitions
spark.driver.cores
spark.executor.cores
spark.executor.instances
spark.dynamicAllocation.enabled
spark.driver.memory TABLE 2-continued spark.executor.memory
spark.yarn.driver.memoryOverhead
spark.yarn.executor.memoryOverhead
spark.yarn.am.memoryOverhead DOPER uses the degree of parallelism as a Proxy Metric. The degree of parallelism is the number of tasks of the application that can run in parallel. The more tasks that can run in parallel subject to the availability of resources, the quicker the application will finish; and the higher will be the speedup of the application. At the same time, the resource efficiency of the application will be high.

DOPER uses information collected by the execution engine that runs an application (e.g., Resource Manager). This can be information related to the amount of available resources, such as available memory and available CPU/Vcores, at the time the application was running.

Figure 6:
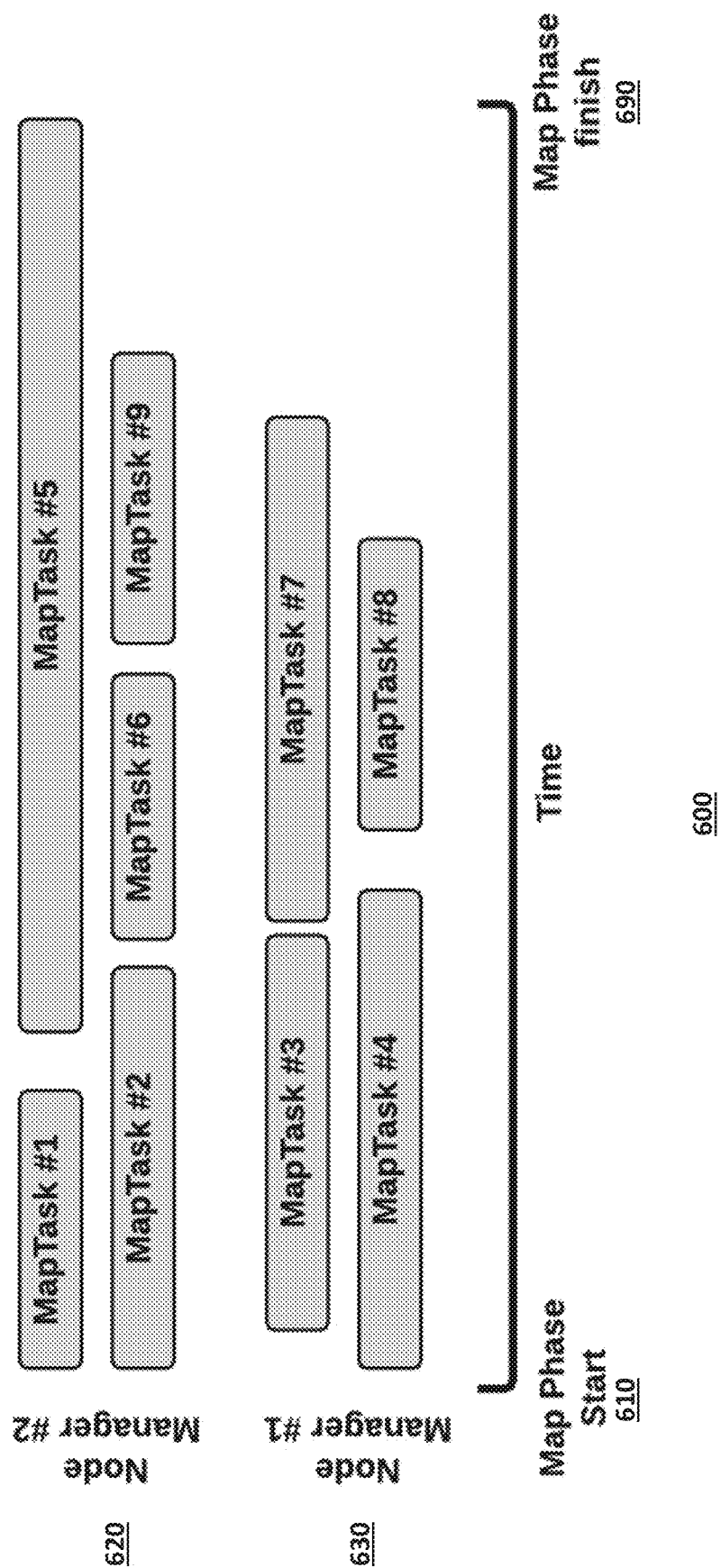
FIG. 6 illustrates an exemplary task mapping process, according to one embodiment.

FIG. 6 illustrates an exemplary task mapping process 600, according to one embodiment. According to one embodiment, DOPER considers the following parameters as shown in FIG. 6:
Available parallelism
Container Sizing
Container Packing
Task (Work) Packing (Subject to skew/load imbalance)

According to one embodiment, DOPER performs the following process:
1) Find Maximum Availability Parallelism (MAP)
2) Find Container Size
3) Find Number of Partitions
4) Compute a recommendation that satisfies a goal
5) Handle multiple applications in a session

Figure 11:
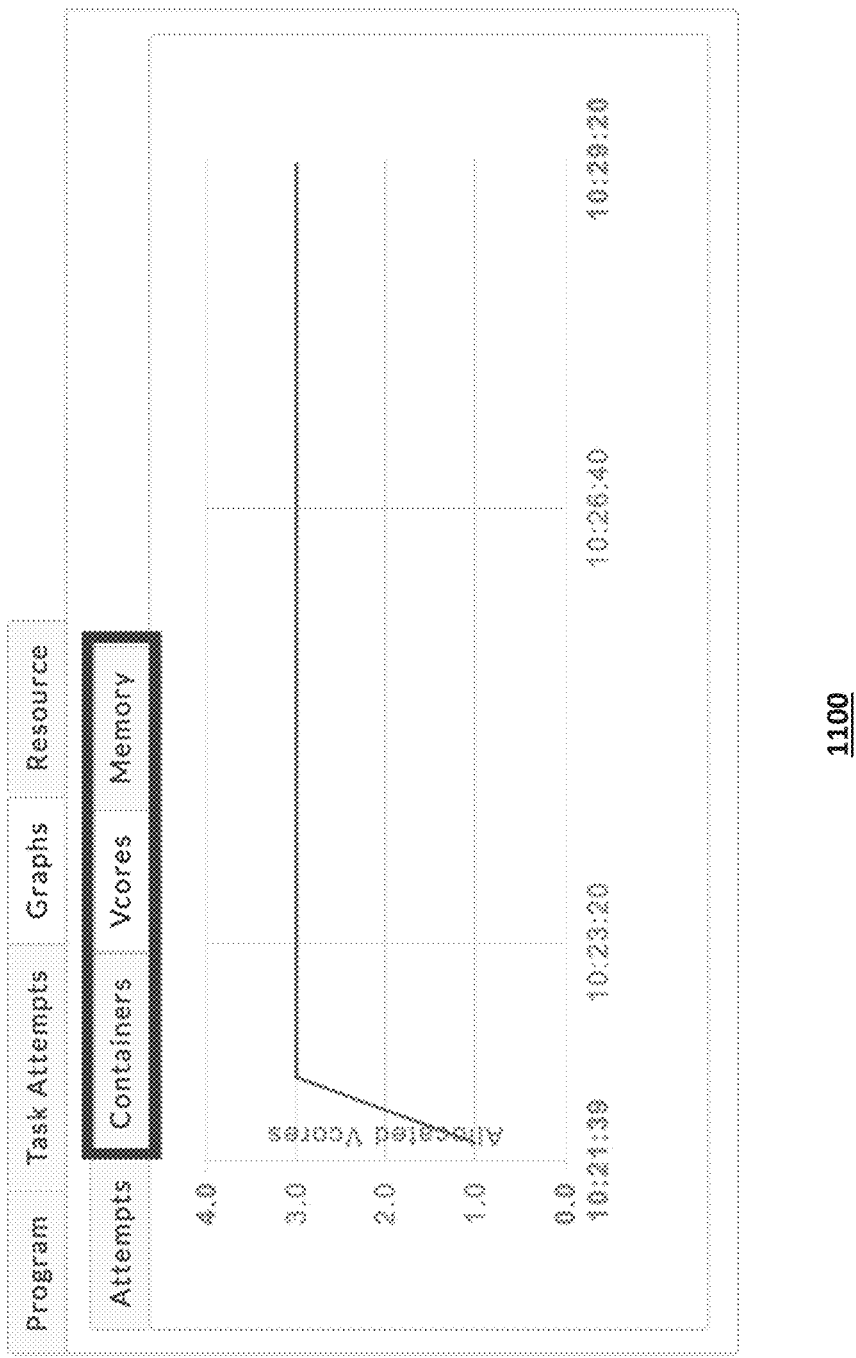
FIG. 11 shows an example user interface that illustrates resource allocation tabs to display the total amount of resources allocated to an application, according to one embodiment.
Figure 12:
FIG. 12 shows an example user interface that illustrates an attempts tab to display the actual number of concurrent tasks executed at any given point of time, according to one embodiment.

[Step 1: Find Maximum Available Parallelism] DOPER uses the total amount of resources available to an application, to compute the Maximum Available Parallelism (MAP), which is the maximum number of Vcores that the application can use in parallel. FIG. 11 shows an example user interface 1100 that illustrates resource allocation tabs (e.g., Containers, Vcores, and Memory) to display the total amount of resources allocated to an application, according to one embodiment. In this case, the maximum level of parallelism (MP) is given by the total number of Vcores that were allocated to the application minus the number of Vcores used by a Driver, which is generally one. FIG. 12 shows an example user interface 1200 that illustrates an attempts tab to display the actual number of concurrent tasks executed at any given point of time, according to one embodiment. The maximum number of concurrent tasks is referred to as actual parallelism (AP). Using this information, DOPER can tune parallelism for an application, as follows:

a. If AP<MP, more tasks could have been executed concurrently with the same resource allocation if more partitions were available. This indicates a need to increase the number of partitions.
b. If AP=MP
  i. If dynamic allocation was enabled, increasing the number of partitions
  ii. If dynamic allocation was disabled, increasing the number of containers in the first place (see Container packing). Then, increase the number of partitions to be at least the number of executors.
c. AP>MP should not occur in principle, no action is required.

Figure 13:
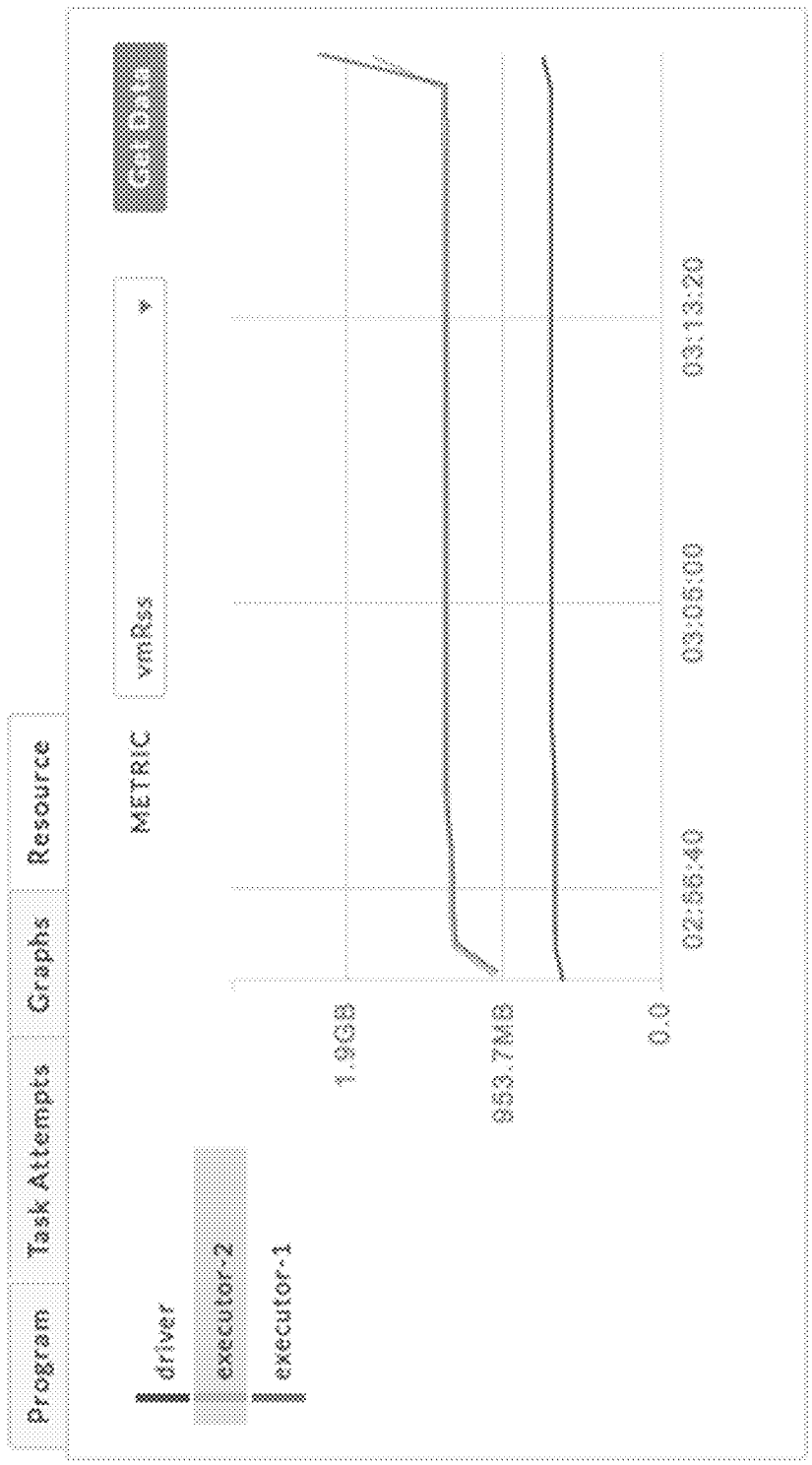
FIG. 13 illustrates an exemplary user interface that shows vmRSS, according to one embodiment.

[Step 2: Find Container Size] DOPER may use Resource utilization to understand the actual memory/CPU resources used in the cluster. For example, "vmRSS" memory can be used to understand the memory utilization at the container level for the application and "processCPULoad" to understand the CPU utilization at container level. An example user interface 1300 that shows vmRSS is shown in FIG. 13, according to one embodiment. This can be used in a multiplicity of scenarios, such as configuring Container Sizing, e.g., Container Shrink or Container Expansion, and Container Packing.

Container shrink issued when the memory and/or the CPU resources are under-utilized. For an example Spark application, these may be determined as follows:
      a) Reduce the memory resources per container, roughly:
        i. spark.executor.memory=(vmRSS memory Executor×1.2)
        ii. spark.driver.memory=(vmRSS memory Driver×1.2)
        iii. spark.yarn.executor.memoryOverhead=max(384 MB, 0.1×spark.executor.memory)
      b) Reduce number of CPUs used per container
        i. If the CPU is under-utilized, and the number of Vcores per container is more than 5 (in one example, this can be the best practice number for Vcores), the system caps it at 5.
      c) Apply container packing
      d) Allocate a minimum number of partitions equal with the number of executors times number of Vcores per executor
      e) If the level of parallelism of the application has changed: re-estimate memory requirements per container Container expansion: Used when the allocated memory and/or CPU resources are over-utilized
a) As a result of a bottleneck analysis, the system increases the memory/Vcores allocated per container
b) For memory expansion:
    i. If successful tasks are available (e.g., a case where skewed tasks fail): estimate new memory allocation based on successfully completed tasks. Estimate memory requirements based on input data processed versus memory used.
    ii. If successful tasks are not available, use a heuristic based on input data processed so far vs. vmRSS memory utilization.
c) For Vcore expansion:
    i. If process level CPU utilization>CPU_HIGH and host level CPU utilization<CPU_MAX_EXPANSION
        1. If #Vcores available=numExecutors, add one more Vcores per container and (if necessary) increase the number of partitions.
        2. If #Vcores available<numExecutors, allocate as many containers that are still available and (if necessary) increase the number of partitions.
d) Apply container packing Container packing: Estimate the number of concurrent executors for the new container allocation When the level of parallelism of the application (the number of partitions, the number of executors, the number of Vcores) changes, DOPER estimates the memory allocation for container sizing. In particular, it may reduce executor memory when: (i) The number of executors and the number of partitions is increased, and (ii) The number of Vcores per executor is decreased. Similarly, it may increase executor memory when: (i) The number of concurrent executors and the number of partitions is decreased, and (ii) The number of Vcores per executor is increased.

[Step 3: Find Number of Partitions (NP)] DOPER may identify the Number of Partitions (NP) as follows:
    a) Input: target task runtime (e.g., set to 2 seconds)
    b) Compute: average number of partitions, task overhead percentile, and task runtime percentile for the application
    c) Output:
      i. If task overhead percentile<25% (increase number of partitions)
        1. scale_factor=task runtime percentile/target task runtime
        2. new number of partitions=average number of partitions×scale_factor
      ii. If task overhead percentile>35% (reduce number of partitions)
        1. scale_factor=task overhead percentile/25%
        2. New number of partitions=max(average number of partitions/scale_factor, numExecutors)

[Step 4: Compute a recommendation to satisfy a goal] DOPER supports a multiplicity of goals. For example, for a Spark application goals and recommendations can be as follows:
    If Goal=Speedup:
      Set spark.dynamicAllocation.enabled to true
      If (0.95×MAP>NP), then Set NP=0.95×MAP
    If Goal=Efficiency:
      Set spark.dynamicAllocation.enabled to true
    If Goal=SLA:
      Set spark.dynamicAllocation.enabled to false
      Set spark.executor.instances=1.2×[(NP×avg_task_time)/(SLA×exec_cores)]

[Step 5: Handle multiple applications in a session] DOPER may support more than one application in the same session. Example actions include:
    Take minimum value of vmRSS from successful apps
    Take NP from the fastest run As another embodiment of a hybrid model with high confidence used when very few training data are available is a process for <App, Resiliency> sessions under memory errors. This computes appropriate memory settings when the application fails due to Out of Memory Error (OOME). Potential uses cases for OOME include: (a) Out of memory error for Driver, (b) Out of memory error for Executor, and (c) Container killed by YARN. In such cases, the present system/intelligence platform 200 performs the following process:
    1) Explores the space to see which values will not cause OOME.
    2) A binary search approach is used to find the best memory settings in a small number of steps. Interval bounds are created and refined as more information is collected.
    3) The exploration phase is not necessarily safe; i.e., it may cause runs that fail. But, they are needed though; e.g., find the smallest memory value that is sufficient to complete the app without failing.
    4) The final suggestion is meant to be safe: it takes the best settings that have been seen so far; e.g., the smallest memory allocation that did not fail the application.

One approach to compute interval bounds for OOME is as follows:

Define an Interval for the memory metric. The left bound value is the original container size that causes OOME. The upper bound value is: yarn.scheduler.maximum-allocation-mb.

For the new run, allocate the maximum memory allocation value: yarn.scheduler.maximum-allocation-mb. Run a new app and measure the memory utilization using vmRSS metric. Refine the interval bound for the max value.

If vmRSS<yarn.scheduler.maximum-allocation-mb, the upper bound value is capped to vmRSS In the next step, the system explores whether: originalAllocation+(vmRSS−originalAllocation)/2 is actually sufficient to run the app.

If the new application fails, then the interval is analyzed: [originalAllocation+(vmRSS−originalAllocation)/2, vmRSS]

If the new application does not fail, the interval is analyzed: [originalAllocation, originalAllocation+(vmRSS−originalAllocation)/2]

The system repeats the above steps for a maximum number of steps. The system then returns the upper bound of the interval.

Figure 7:
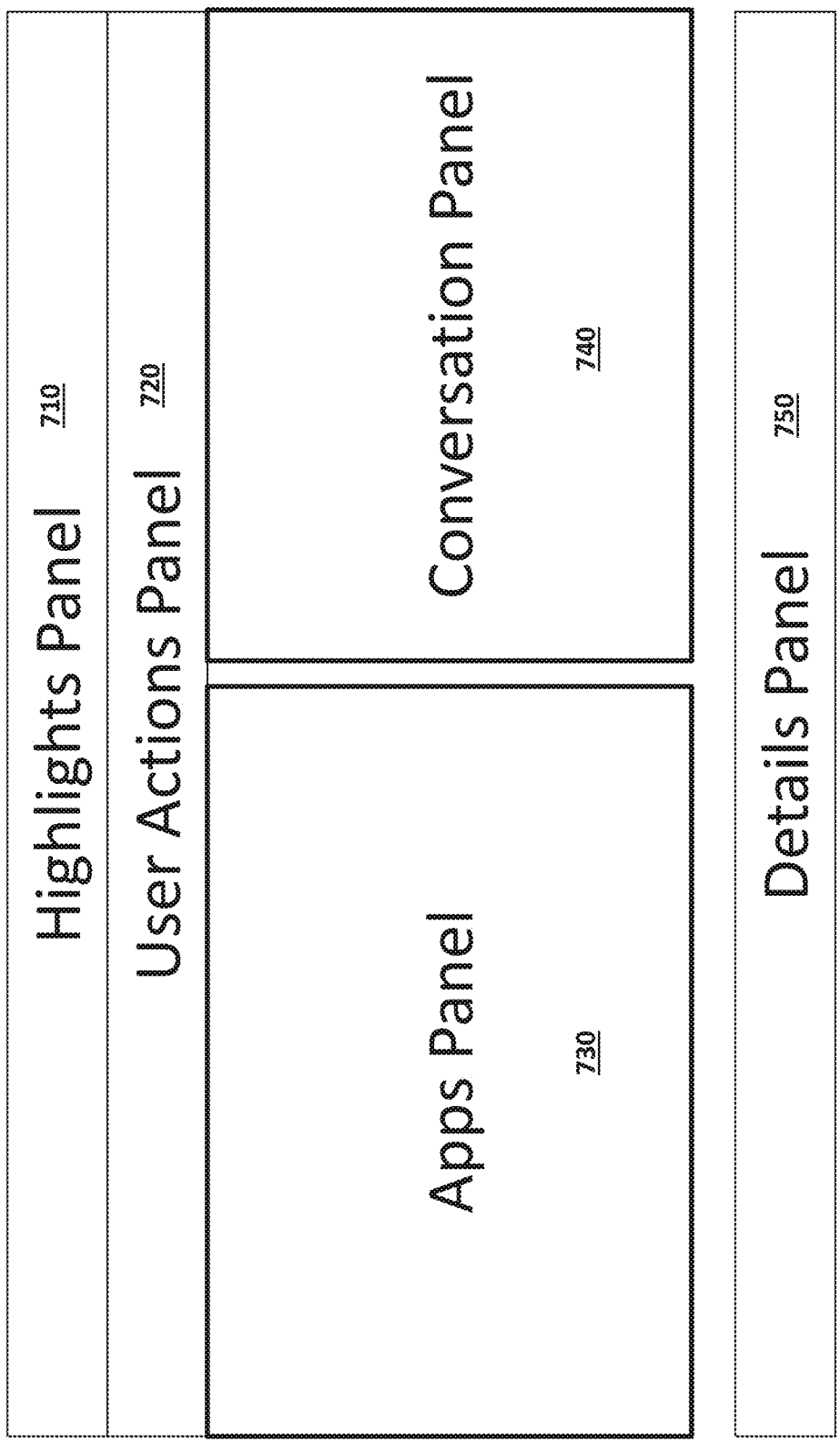
FIG. 7 is an exemplary user interface for optimizing an application on a cluster using the sessions manager, according to one embodiment.

A sessions manager 226 provides a user with information related to sessions operation. This information may be organized in panels. FIG. 7 is an exemplary user interface 700 for optimizing an application on a cluster 240 using the sessions manager 226, according to one embodiment. The user interface includes highlights 710, user actions 720, applications 730, conversation 740, and details 750 panels. A different presentation of similar level of information is also possible.

Figure 8:
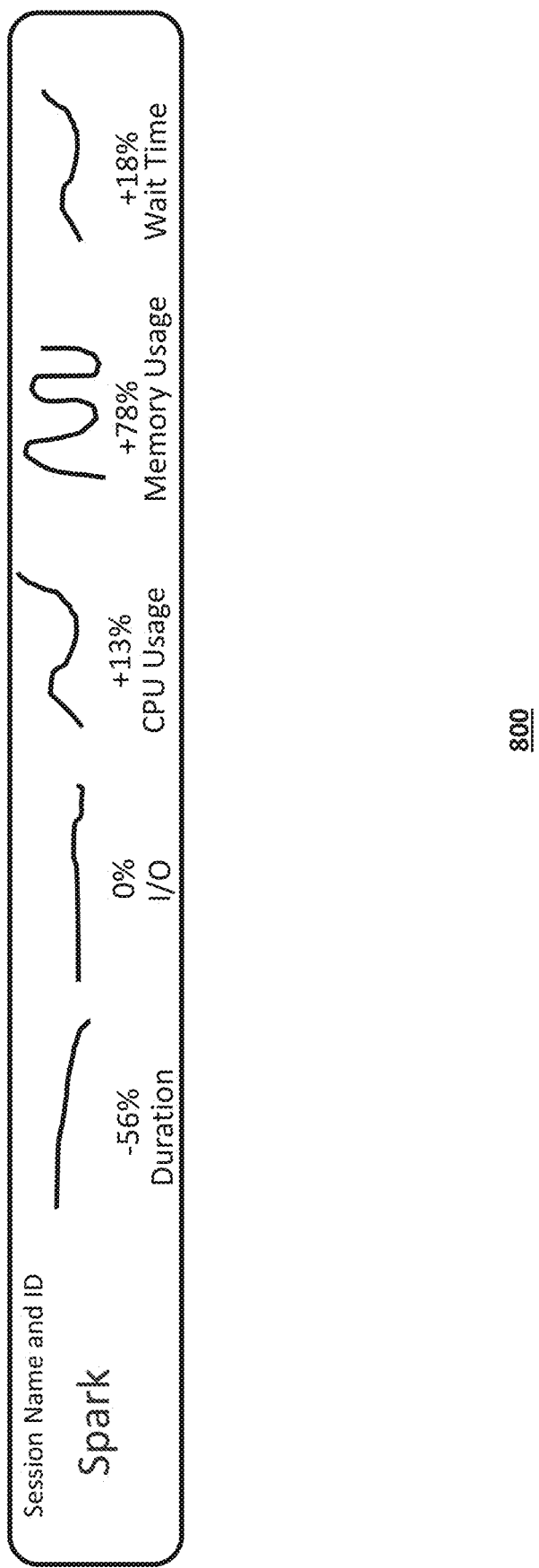
FIG. 8 illustrates an exemplary highlights panel, according to one embodiment.

Highlights include key metrics at session level. FIG. 8 illustrates an exemplary highlights panel 800, according to one embodiment. This highlights panel is shown for Spark, but may be for any application, such as:

Individual apps, e.g., Spark, HiveMapReduce
DAG/Pipelines, e.g., Oozie, Airflow, Tagged, Streaming
SQL app type (e.g., should I run this query on Impala, Hive, or SparkSQL?)
[App Groups] Apps on a table, Apps in a queue, Apps in the cluster over 1 week And also, the highlights panel may comprise various KPI Trend Charts, such as:

Coordinated Sparklines. These can be 'clickable'; 'On Click' on a point in the sparkline, the corresponding application shown in the Application Panel is also highlighted and/or selected.

Along with visuals, as sparklines, the Highlight Panel may also include value changes (e.g., as percentage (%)) with respect to a 'Reference App'. A reference application may be the initial application or a different one characterized as 'reference'.

Figure 9:
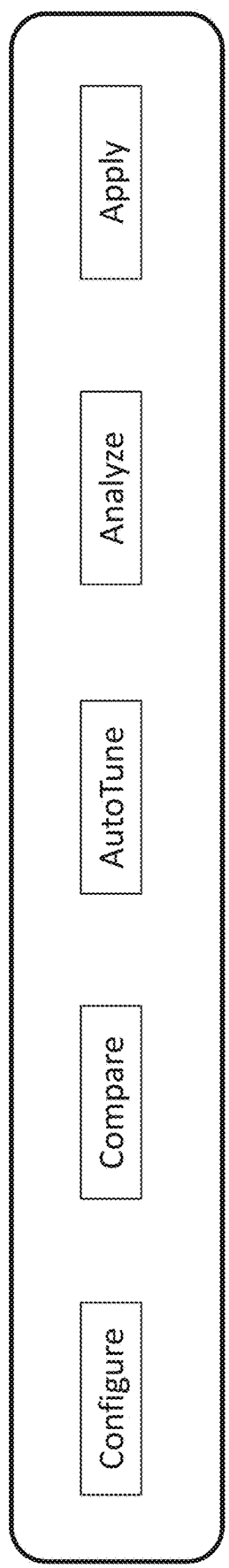
FIG. 9 illustrates an exemplary user actions panel, according to one embodiment.

The sessions manager 226 may have a number of actions, shown in an Actions Panel. FIG. 9 illustrates an exemplary user actions panel 900, according to one embodiment. From the user actions panel, a user can configure a number of features for the sessions manager 226, such as:

Configure
Compare
Show Similar Apps
Show Similar Sessions
AutoTune
Analyze
Apply [Recommendations]
Watch [Recommendations]
Enforce [Recommendations]

From the configure process of the user action panel, a user can set the following parameters:

Set parameters needed to run the app
Set impersonation modes & credentials needed to run the app (none used by default)
Set queue to submit app to when the app runs (nothing will be set by default)
Set max runs that will be done (example default can be 5)
Set number of retries for each failed run (example default can be 0)
Set number of retries for each successful run (example default can be 0)
Ignore failed runs unless Reference App has failed status (example default can be true)
Add apps
    Have option to enter SQL directly
Remove apps
Set Reference App (example default can be first run added)
Set Performance Goal
    Have options to specify what-if conditions and constraints (e.g., data size may grow by 20%)
Set resource usage and/or dollar cost budget for runs The sessions manager 226 may show the applications run in a session (e.g., tasks) in an Applications Panel. FIG. 10 an exemplary applications panel 1000, according to one embodiment.

Reference application is highlighted
A Selector toggles to select or unselect everything. This will be used to select the apps to compare. Can optimize for the compare with highlighted Reference Application
Table is sortable
On click, a panel showing more details for the application opens The sessions manager 226 informs users about a session's progress and on-going findings in a conversational manner. In one example, a Conversation Panel provides timestamped and scrollable messages that are organized up (or down) in time order, and points by default to latest message from the system.

The system explains to the user:
    What was found
    What to do next
Format: Timestamp, Message
Customized views for specific message types
A key message type is the Analysis/AutoTune Result
Message Types:
    Progress message for an action
    Status message for an action
    Guidance message: What could the user do next
    Analysis/AutoTune Result
The recommendations to apply, track, or enforce can be controlled by user. By default, everything recommended can be selected.

Additional details on applications executed in a session or on any other parameter related to a session may be shown in a Details Panel.

Figure 14:
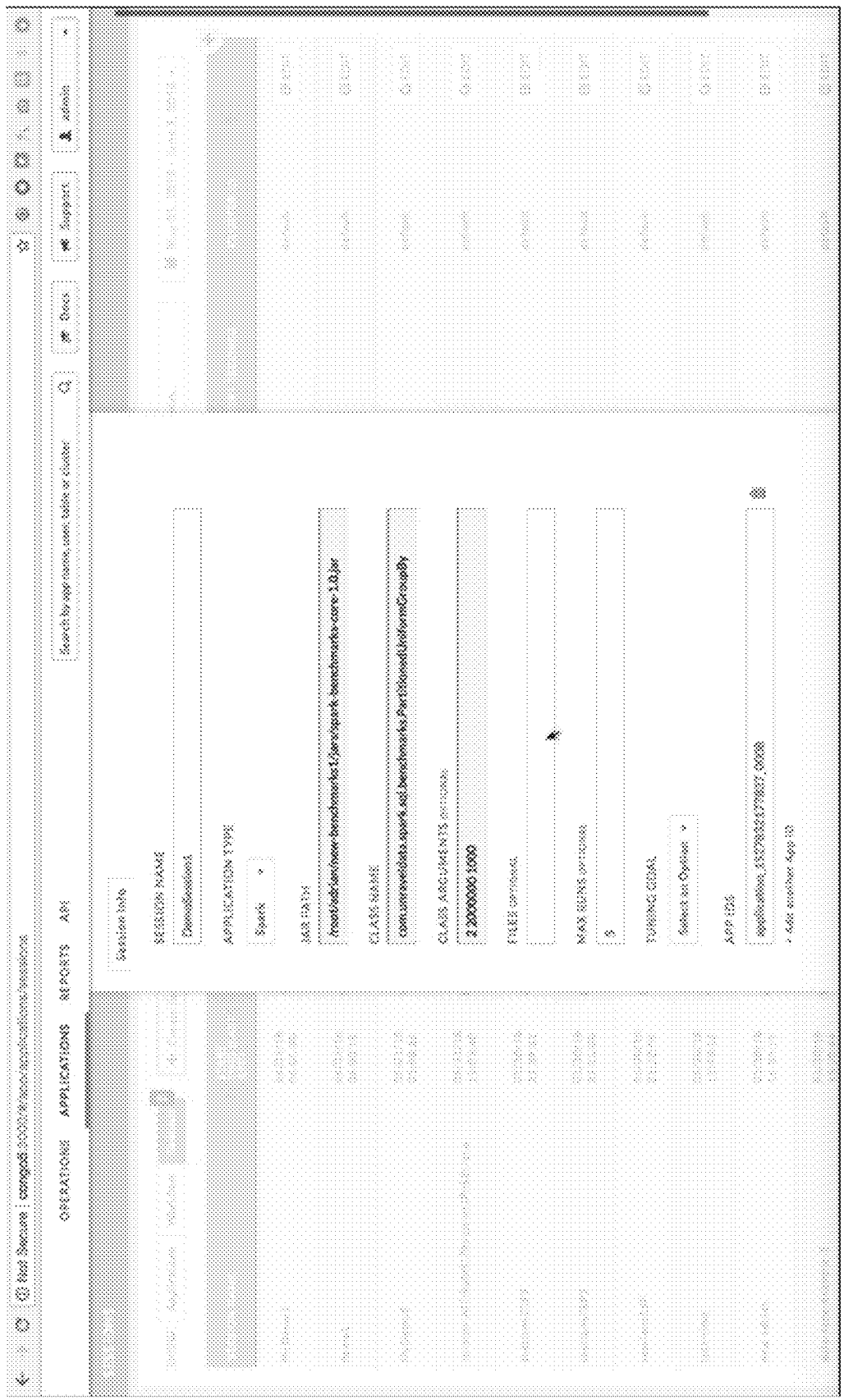
FIG. 14 illustrates an exemplary user interface for interacting with the sessions manager to initiate a session, according to one embodiment.

FIG. 14 illustrates an exemplary user interface 1400 for interacting with the sessions manager 226 to initiate a session, according to one embodiment. To initiate a session, the user specifies an application type, parameters (e.g., jar path, class name, class arguments, files, max runs) and a goal ("TUNING GOAL") from a dropdown menu. The user can also specify more than one application to analyze (e.g., by providing an additional App ID).

Figure 15:
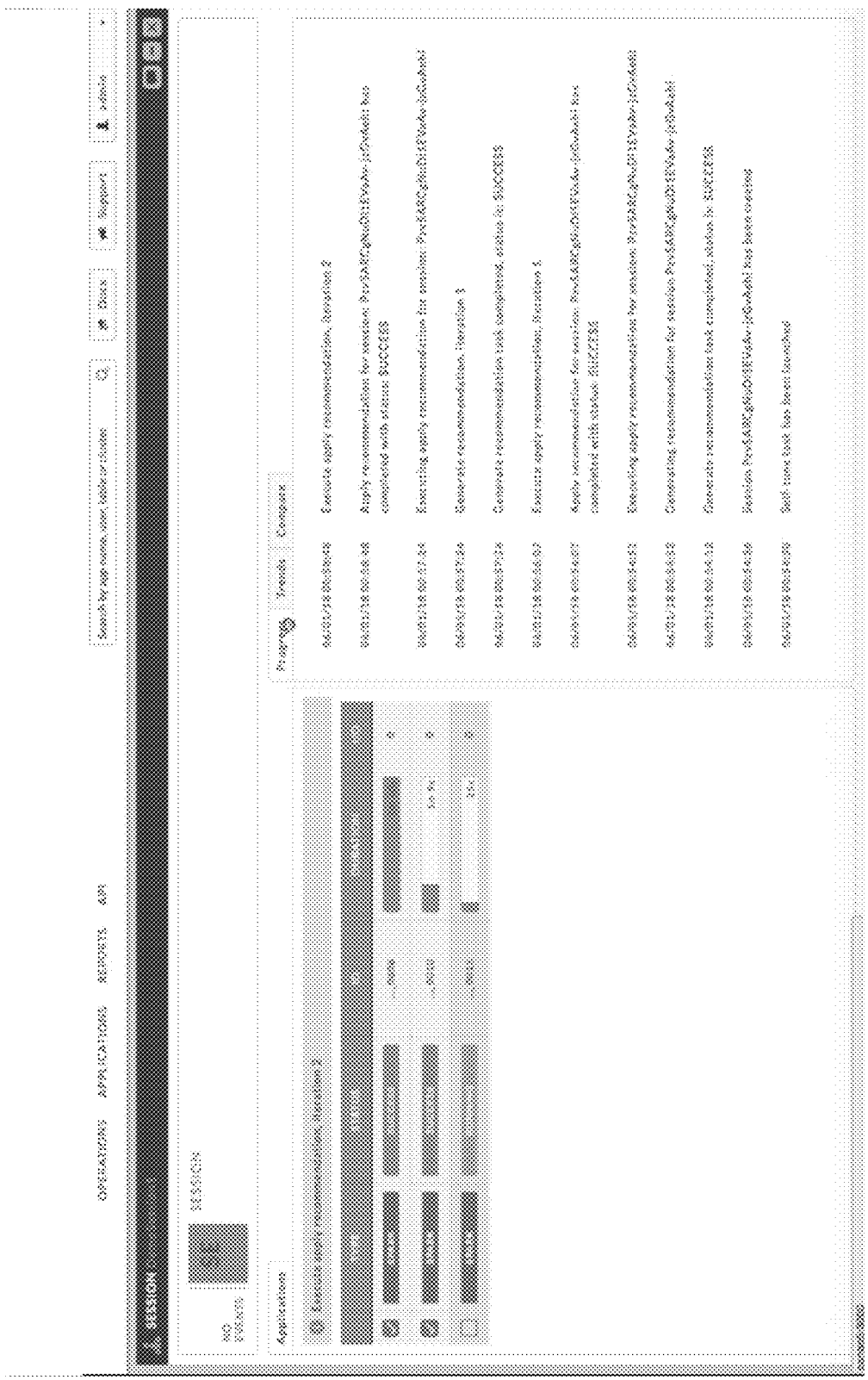
FIG. 15 illustrates an exemplary user interface showing progress during a session, according to one embodiment.

FIG. 15 illustrates an exemplary user interface 1500 showing progress during a session, according to one embodiment. On the left, the system shows the progress of a "running" application and lists applications that completed their sessions before the running application. On the right, the interface shows a conversational panel with messages as described above. In the example shown in FIG. 15 the first execution of the application has completed successfully. The goal of this session could be to improve the speedup or efficiency of this application. In another example, the first run could have status FAILED. In this case, a session manager 226 could analyze the application and the goal of the analysis could be reliability, e.g., find why the application failed and fix it. In another example, the goal could be both reliability and speedup.

Figure 16:
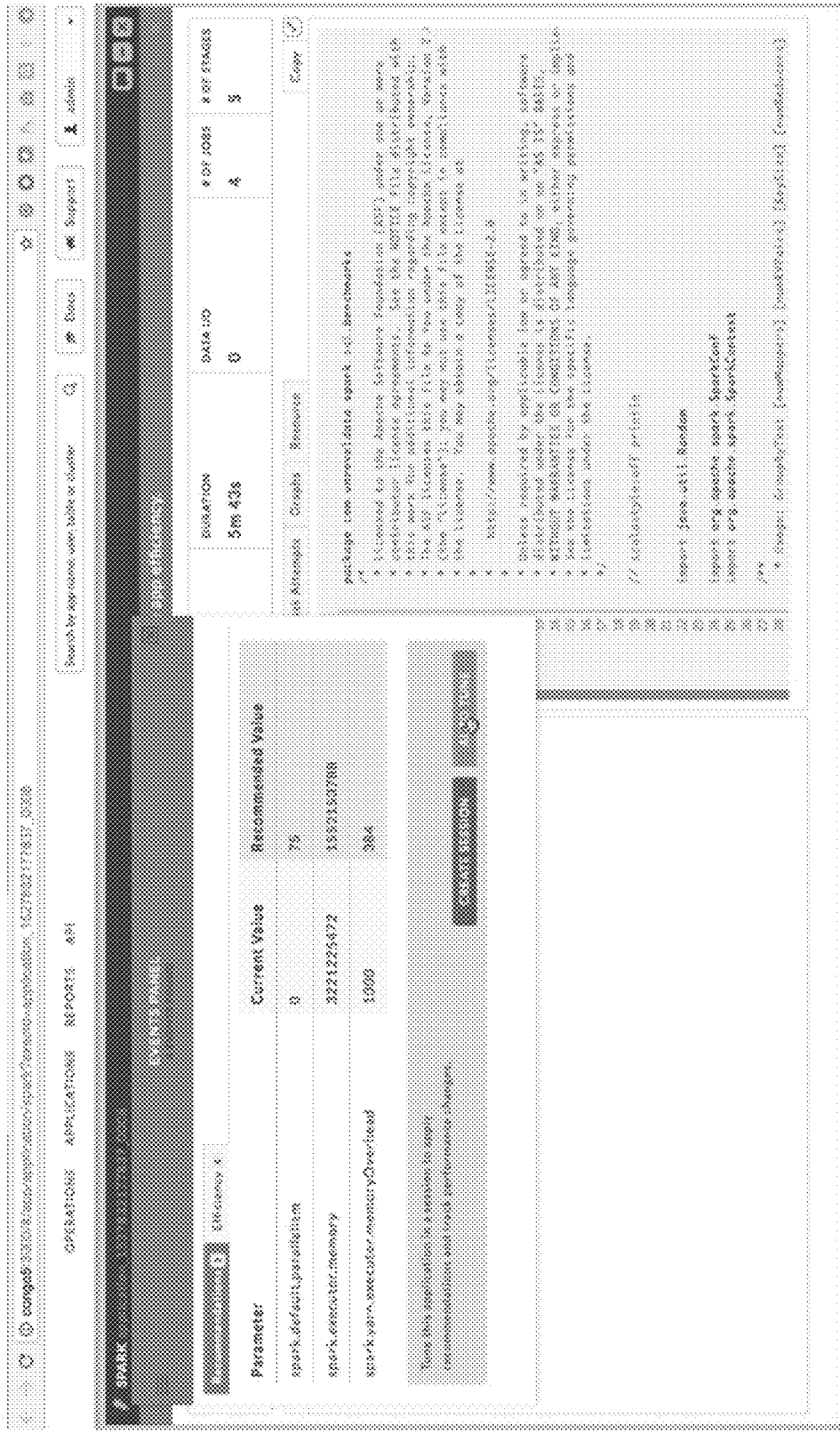
FIG. 16 illustrates an exemplary user interface showing application analytics and parameters, as well as recommendations found by the sessions manager, according to one embodiment.

FIG. 16 illustrates an exemplary user interface 1600 showing application analytics and parameters, as well as recommendations found by the sessions manager 226, according to one embodiment. The user may be presented with options like "apply these recommendations automatically" or "analyze the application in a session."

Figure 17:
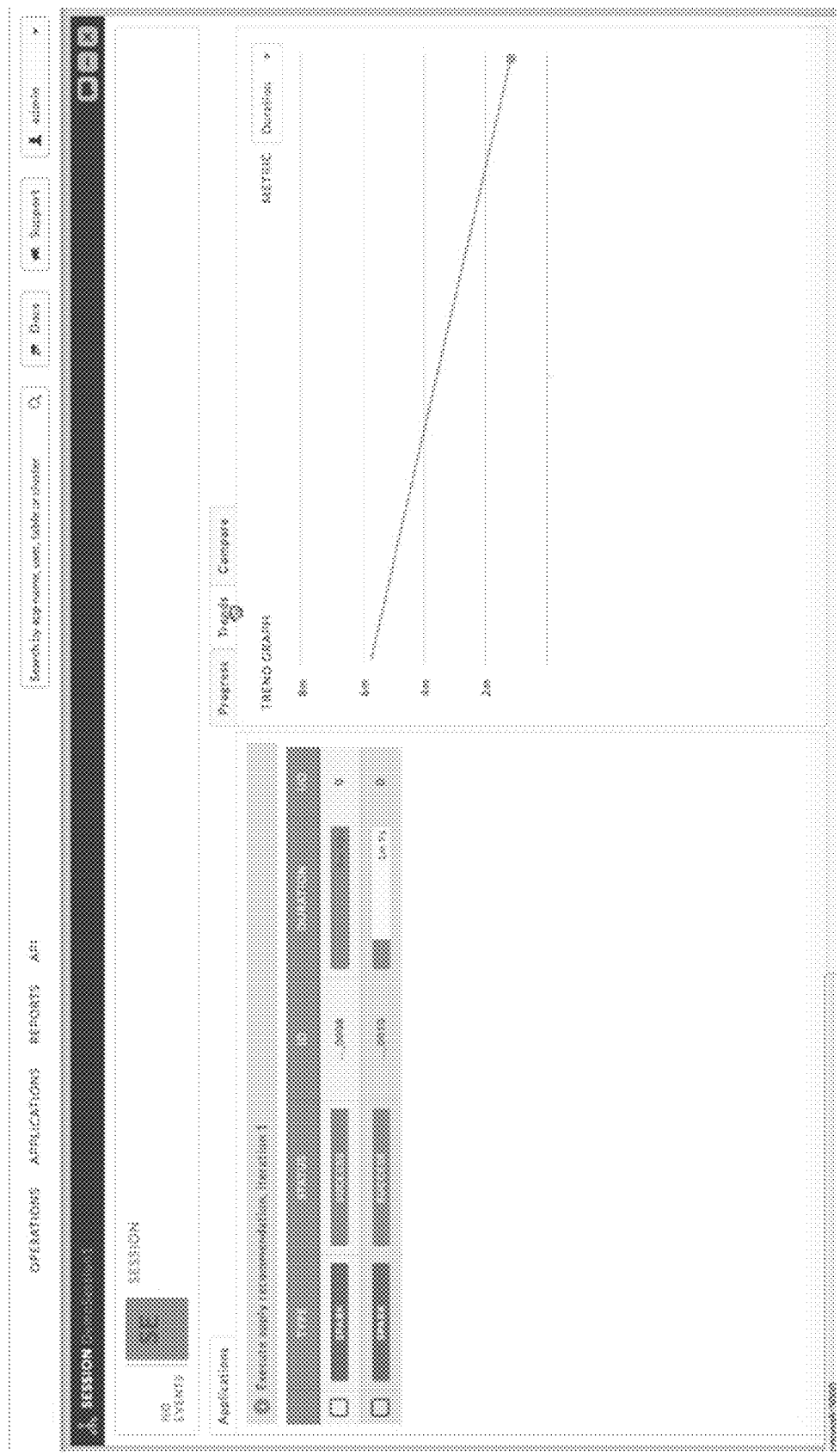
FIG. 17 illustrates an exemplary user interface that shows trends found for an application in a session, according to one embodiment.

FIG. 17 illustrates an exemplary user interface 1700 that shows trends found for an application in a session, according to one embodiment. According to the example shown in user interface 1700, the performance of an application within this specific session improved from 5 minutes and 43 seconds to 1 minute and 9 seconds.

Figure 18:
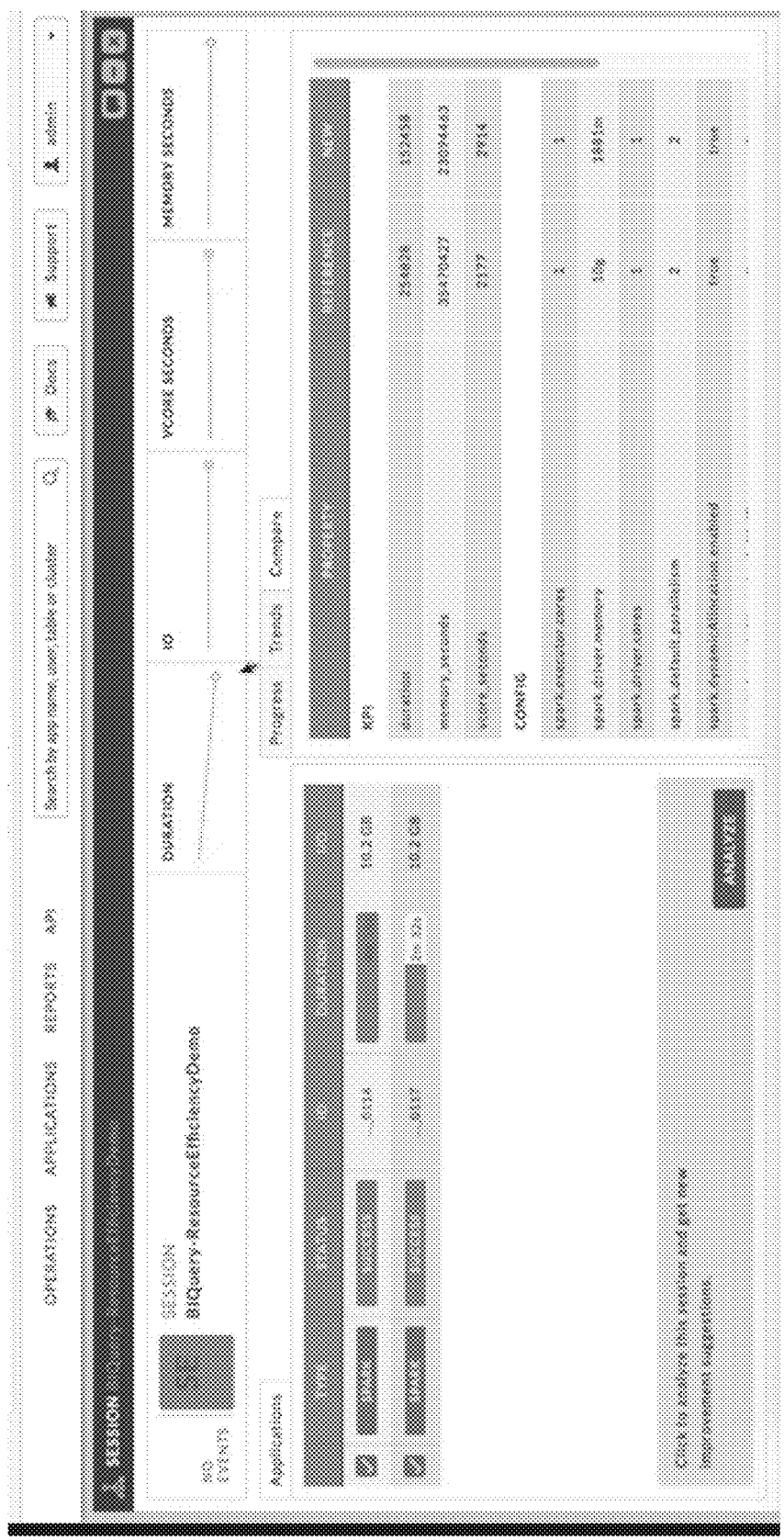
FIG. 18 illustrates an exemplary user interface that shows a comparison of two different executions of the same application in a session, according to one embodiment.

FIG. 18 illustrates an exemplary user interface 1800 that shows a comparison of two different executions of the same application in a session, according to one embodiment. The user interface compares the effectiveness of recommendations, for example. On the left, the user interface show the applications selected for comparison. On the right, the user interface shows a comparison of the applications' KPI/ CONFIG/ . . . values. These can be used, for example, to explain to the user why two executions are different and what needs to be done to improve an application. At the top of the figure, the user interface shows an example list of highlights as described above.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A computer-implemented method, comprising:
receiving a selection of a goal for an application on a cluster of compute nodes, wherein the cluster of compute nodes is part of a big data system and wherein the goal includes one or more of a speedup goal, an efficiency goal, a reliability goal, and a service level agreement goal;
collecting predicted values of metrics associated with the goal, the big data system, and the application using cost-based and rule-based query optimization techniques and machine learning;
executing the application on the cluster of compute nodes and collecting data associated with the goal from the big data system;
determining, based on the data and predicted values, a recommendation to adjust one or more parameters that would allow the goal to be achieved to optimize running the application on the cluster of compute nodes of the big data system; and
providing the recommendation to adjust the one or more parameters.

2. The computer-implemented method of claim 1, further comprising providing an explanation of the recommendation.

3. The computer-implemented method of claim 1, wherein determining the recommendation further comprises analyzing data from a data source, the data source including one or more of (a) data collected in a current execution session; (b) data collected from previous execution sessions of the application; and (c) data related to a past use of the recommendation.

4. The computer-implemented method of claim 3, further comprising:
collecting observed metrics by running the application with a set of recommendations; and
collecting predicted values of metrics without running the application.

5. The computer-implemented method of claim 3, further comprising running the application on datasets that are specific to a user.

6. The computer-implemented method of claim 3, further comprising executing the application in a specific resource pool.

7. The computer-implemented method of claim 1, further comprising modifying the parameters while executing the application on the cluster.

8. The computer-implemented method of claim 1, further comprising modifying the goal while executing the application on the cluster.

9. The computer-implemented method of claim 1, wherein the application is for one of MapReduce, Spark, Impala, Hive, Tez, LLAP, Kafka, and SQL.

10. The computer implemented method of claim 1, wherein the data collected includes observed metrics obtained by running the application with a set of recommendations.

11. The computer-implemented method of claim 1, wherein collecting data associated with the goal includes using a probe that determines a configuration that meets the goal.

12. The computer-implemented method of claim 11, wherein determining the recommendation further comprises executing the application using the parameter over multiple iterations; analyzing historical data; and analyzing probe data generated using the configuration.

13. The computer-implemented method of claim 11, wherein the probe implements one or more models, the models including true, proxy, rule, probabilistic, and hybrid.

14. The computer-implemented method of claim 1, wherein the recommendation is a set of recommendations.

15. The computer-implemented method of claim 1, wherein the parameters include one or more of maximum availability parallelism, container size, and a number of partitions of the cluster.

16. The computer-implemented method of claim 1, further comprising displaying a user interface, the user interface including one or more user selectable actions.

17. The computer-implemented method of claim 16, wherein the one or more user selectable actions include configure, compare, autotune, analyze, apply, enforce, and watch.

18. The computer-implemented method of claim 1, further comprising transmitting the recommendation to a distributed storage system of the big data system to increase the performance of the distributed storage system.

19. A computer-implemented method, comprising:
receiving a selection of a goal for an application on a cluster of compute nodes, wherein the cluster of compute nodes are part of a big data system and wherein the goal includes one or more of a speedup goal, an efficiency goal, a reliability goal, and a service level agreement goal;
collecting predicted values of metrics associated with the goal, the big data system, and the application using cost-based and rule-based query optimization techniques and machine learning;
determining, based on the predicted values, a recommendation to adjust one or more parameters that would allow the goal to be achieved to optimize running the application on the cluster of compute nodes of the big data system; and
providing the recommendation to adjust the one or more parameters.

20. The computer-implemented method of claim 19, wherein determining the recommendation further comprises analyzing data from a data source, the data source including one or more of (a) data collected in a current execution session; (b) data collected from previous execution sessions of the application; and (c) data related to a past use of the recommendation.

21. The computer-implemented method of claim 20, further comprising:
collecting observed metrics by running the application with a set of recommendations; and
collecting predicted values of metrics without running the application by using cost-based query optimizers.

* * * * *